US012689325B1

(12) United States Patent
Manson et al.

(10) Patent No.: US 12,689,325 B1
(45) Date of Patent: Jul. 21, 2026

(54) FOLDABLE NESTED FRAME SOLAR ARRAY SYSTEM AND METHOD OF MANUFACTURE

(71) Applicant: Redwire Space, Inc., Jacksonville, FL (US)

(72) Inventors: Jeffrey A. Manson, Santa Barbara, CA (US); Quentin Williams, Santa Barbara, CA (US); Matthew LaPointe, Santa Barbara, CA (US); Michael C. Stinson, Goleta, CA (US); Kenneth L. Steele, Carlsbad, CA (US)

(73) Assignee: Redwire Space, Inc., Jacksonville, FL (US)

( * ) Notice: Subject to any disclaimer, the term of this patent is extended or adjusted under 35 U.S.C. 154(b) by 60 days.

(21) Appl. No.: 18/231,227

(22) Filed: Aug. 7, 2023

(51) Int. Cl.
*H02S 30/20* (2014.01)
*B64G 1/44* (2006.01)

(52) U.S. Cl.
CPC .............. *H02S 30/20* (2014.12); *B64G 1/443* (2013.01)

(58) Field of Classification Search
CPC ................................ H02S 30/20; B64G 1/443
See application file for complete search history.

(56) References Cited

U.S. PATENT DOCUMENTS

| | | | |
|---|---|---|---|
| 6,637,702 | B1 | 10/2003 | McCandless |
| 9,156,568 | B1 | 10/2015 | Spence et al. |
| 9,346,566 | B2 | 5/2016 | Spence et al. |
| 9,444,004 | B1 | 9/2016 | Spence et al. |
| 9,604,737 | B2 | 3/2017 | Spence et al. |
| 9,611,056 | B1 | 4/2017 | Spence et al. |
| 9,620,658 | B1 | 4/2017 | Spence et al. |
| 2021/0058027 | A1 | 2/2021 | Oakley, Jr. |
| 2021/0320619 | A1* | 10/2021 | Rehder .................. H02S 30/10 |
| 2022/0306324 | A1 | 9/2022 | Murphey et al. |

FOREIGN PATENT DOCUMENTS

| | | | | | |
|---|---|---|---|---|---|
| CN | 201773843 | U | * | 3/2011 | ............. H02S 30/10 |
| CN | 111786629 | A | * | 10/2020 | ............. H02S 30/10 |
| DE | 202013001670 | U1 | * | 7/2014 | ............. F24J 2/5211 |

OTHER PUBLICATIONS

Hai, "CN 111786629 A, Machine Translation", 2020 (Year: 2020).*
Chen, "CN 201773843 U, Machine Translation", 2011 (Year: 2011).*
Lauinger, "DE2013001670U1, Machine Translation" 2013 (Year: 2013).*

* cited by examiner

*Primary Examiner* — Devina Pillay
(74) *Attorney, Agent, or Firm* — Terry M. Sanks, Esq.; Beusse Sanks, PLLC

(57) ABSTRACT

A system is provided that includes N populated frame assemblies (PFAs) having a folded nested state and an unfolded state. The N PFAs have a nesting height when in the folded nested state that is less than a sum of a height of all PFAs of the N PFAs, where the N is a non-zero integer number greater than one. The embodiments also include a frame assembly and a method of manufacture.

13 Claims, 19 Drawing Sheets

708

304

302

526 320 106

APPROX. 2X DEPTH POTENTIAL FOR HIGH FREQUECY

104

APPROX. 2X DEPTH POTENTIAL
FOR HIGH FREQUECY

1200

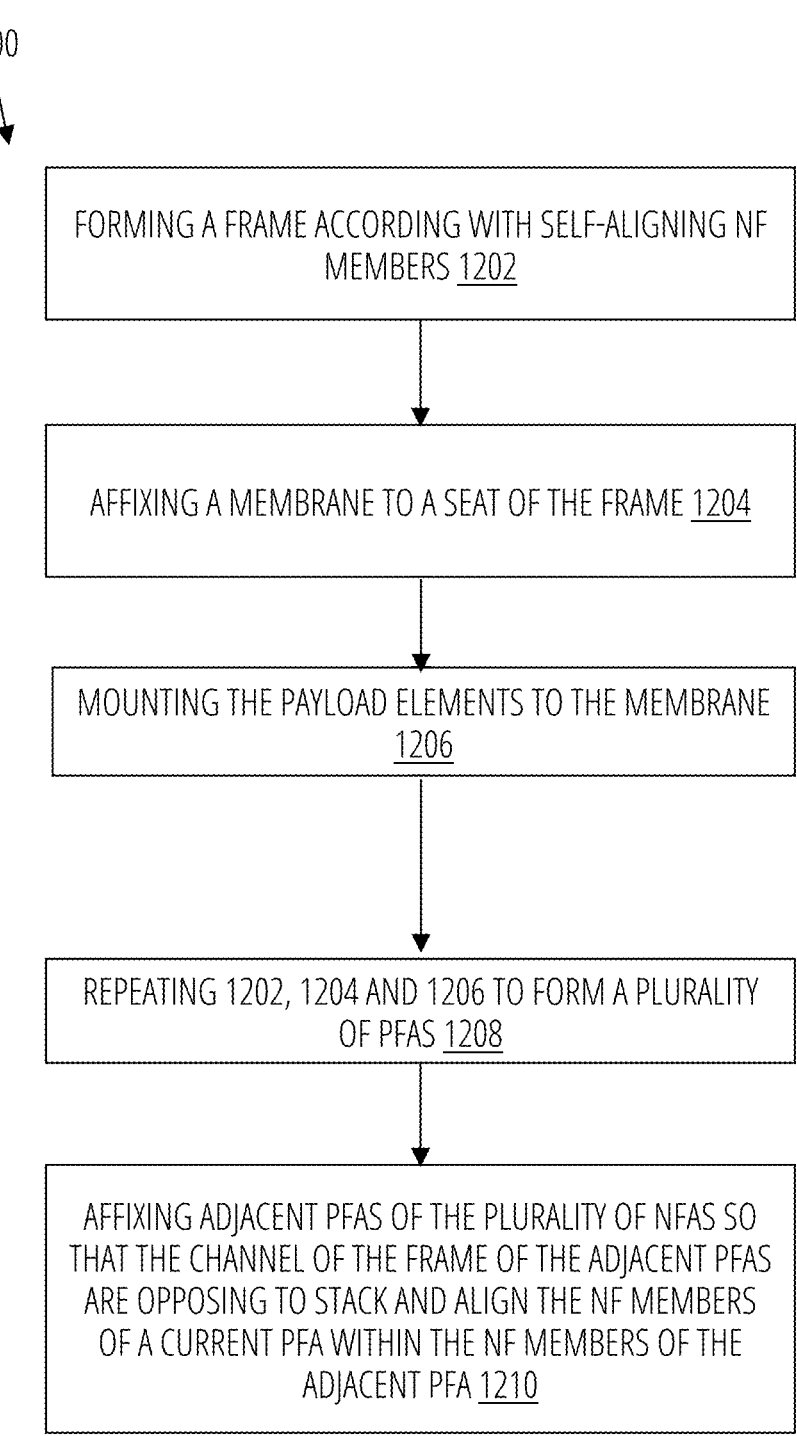

FORMING A FRAME ACCORDING WITH SELF-ALIGNING NF MEMBERS 1202

AFFIXING A MEMBRANE TO A SEAT OF THE FRAME 1204

MOUNTING THE PAYLOAD ELEMENTS TO THE MEMBRANE 1206

REPEATING 1202, 1204 AND 1206 TO FORM A PLURALITY OF PFAS 1208

AFFIXING ADJACENT PFAS OF THE PLURALITY OF NFAS SO THAT THE CHANNEL OF THE FRAME OF THE ADJACENT PFAS ARE OPPOSING TO STACK AND ALIGN THE NF MEMBERS OF A CURRENT PFA WITHIN THE NF MEMBERS OF THE ADJACENT PFA 1210

FIG. 12

FOLDABLE NESTED FRAME SOLAR ARRAY SYSTEM AND METHOD OF MANUFACTURE

BACKGROUND

Embodiments relate to space-based solar arrays or alternate payloads and more specifically, a foldable nested frame array system and method of manufacture.

Deployable structures have been a challenge since the beginning of space flight. For many decades solar arrays have been deployed using rigid carbon fiber honeycomb substrates. While they remain a technical solution for many spacecraft, they have many negative aspects. For example, the honeycomb style composite substrates are expensive, long lead, and highly workmanship dependent while manufacturing. Additionally rigid substrates require completion of substrate manufacturing prior solar cell laydown to commence, driving the complete system schedule.

Recently the satellite market moved from large singular satellites with large solar arrays towards smaller satellite systems launched in pairs, or larger groups. Satellite constellation systems of hundred or even thousands of satellites are also being deployed into space to provide internet service, earth monitoring and communications for various regions on earth. These satellite systems use solar energy to power various electronic modules on-board the satellite.

In some instances, when the satellite is launched, the solar arrays are folded. The impact or vibration forces caused by launching the satellite for deployment may damage the solar arrays.

BRIEF SUMMARY

In one aspect, a system is provided that includes N populated frame assemblies (PFAs) having a folded nested state and an unfolded state. The N PFAs have a nesting height when in the folded nested state that is less than a sum of a height of all PFAs of the N PFAs, where the N is a non-zero integer number greater than one.

In one aspect, a frame assembly for a nestable frame array (NFA) system having a plurality of frame assemblies is provided. The frame assembly comprises a frame including a pair of opposing self-aligning, nestable frame (NF) members on opposing sides of the frame. Each NF member comprises at least one channel. The frame includes traverse frame members coupled perpendicularly to free ends of the NF member, wherein the pair of NF members and the traverse frame members form a seat. The frame assembly includes a membrane coupled to the seat for mounting payload elements. The pair of NF members stack and nest within the at least one channel of a pair of NF members of an adjacent frame assembly of the system In one aspect, a method of manufacturing a stackable payload array includes forming a frame assembly with at least one channel. The method includes affixing a membrane to a seat of the frame assembly to form a populated frame assembly (PFA). The method repeats the forming a frame assembly and the affixing of the membrane to form a plurality of PFAs.

The method includes affixing adjacent PFAs of the plurality of PFAs so that at least one channel of the frame of a respective PFA oppose the at least one channel of an adjacent PFA to stack and align paired nestable frame (NF) members within another pair of NF members of the adjacent PFA. The plurality of PFAs has a nesting height when in a folded nested state that is less than a sum of the height of the plurality of PFAs

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 12 illustrates a method of manufacturing a stackable frame payload array.

DETAILED DESCRIPTION

Figure 1:
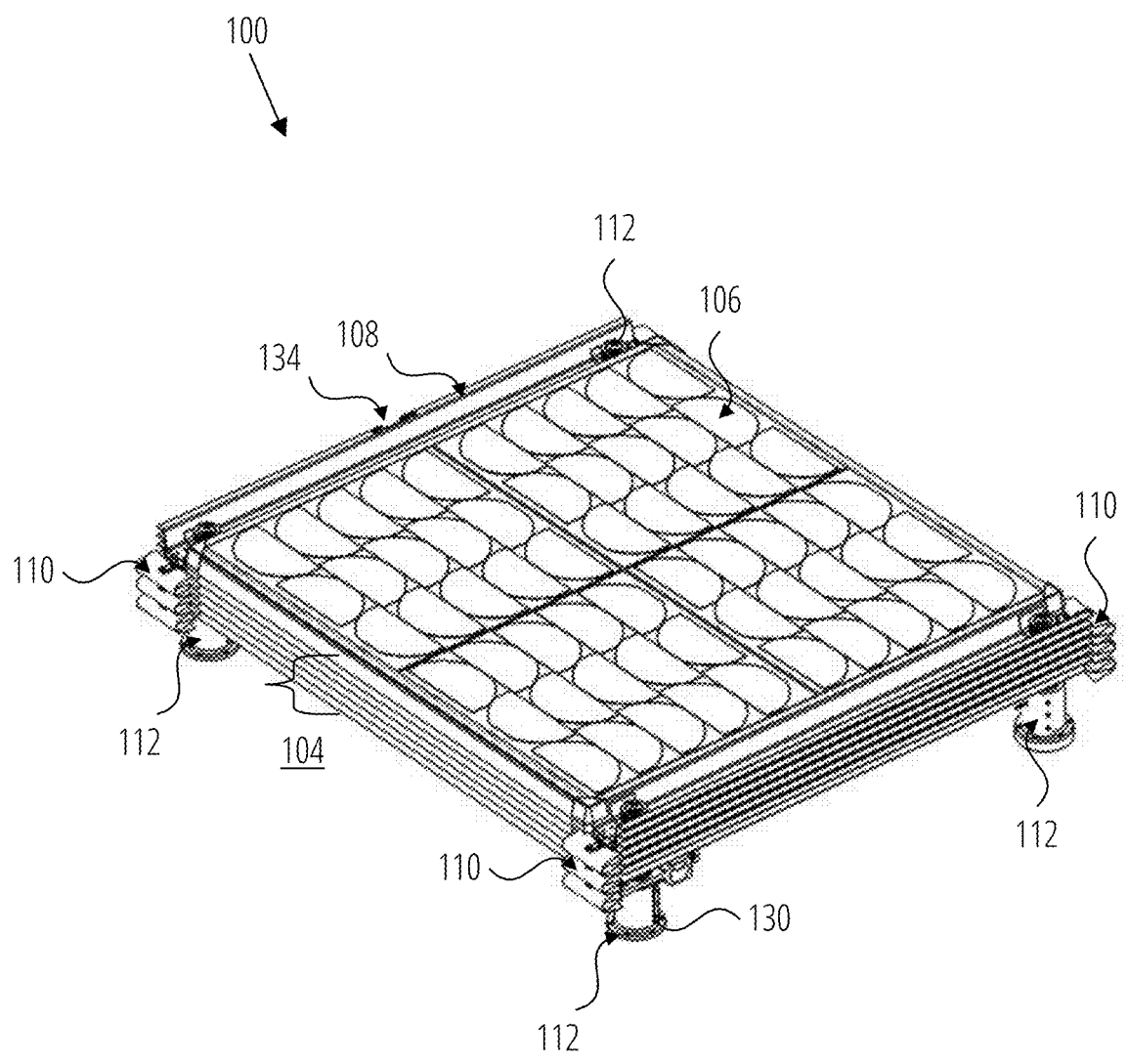
FIG. 1 illustrates a perspective view of a nested frame solar array system in a folded nested state in accordance with one embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The term payload as used herein may include radiator elements, phased array antenna elements, electrical transducer elements, thermal or optical shields, photovoltaic elements (solar cells), and optical apertures, for example.

Embodiments of the nested frame array system 100 offer an improved solution for all flat-pack solar arrays for the small satellite market, for example. The frame assembly described below may be used to mount other payloads.

Although the embodiments described below relate to solar arrays with photovoltaic elements, the system may be used for stacking other payloads to form a nested frame payload array (NFPA) to launch and deploy into space.

FIG. 1 illustrates a perspective view of a nested frame array (NFA) system 100 in a folded nested state in accordance with one embodiment. The NFA system 100 may be coupled to a spacecraft, satellite or another space-based platform (wherein as used herein, "spacecraft," "satellite," and "spaced-based platform" or "platform" are interchangeable).

Figure 2A:
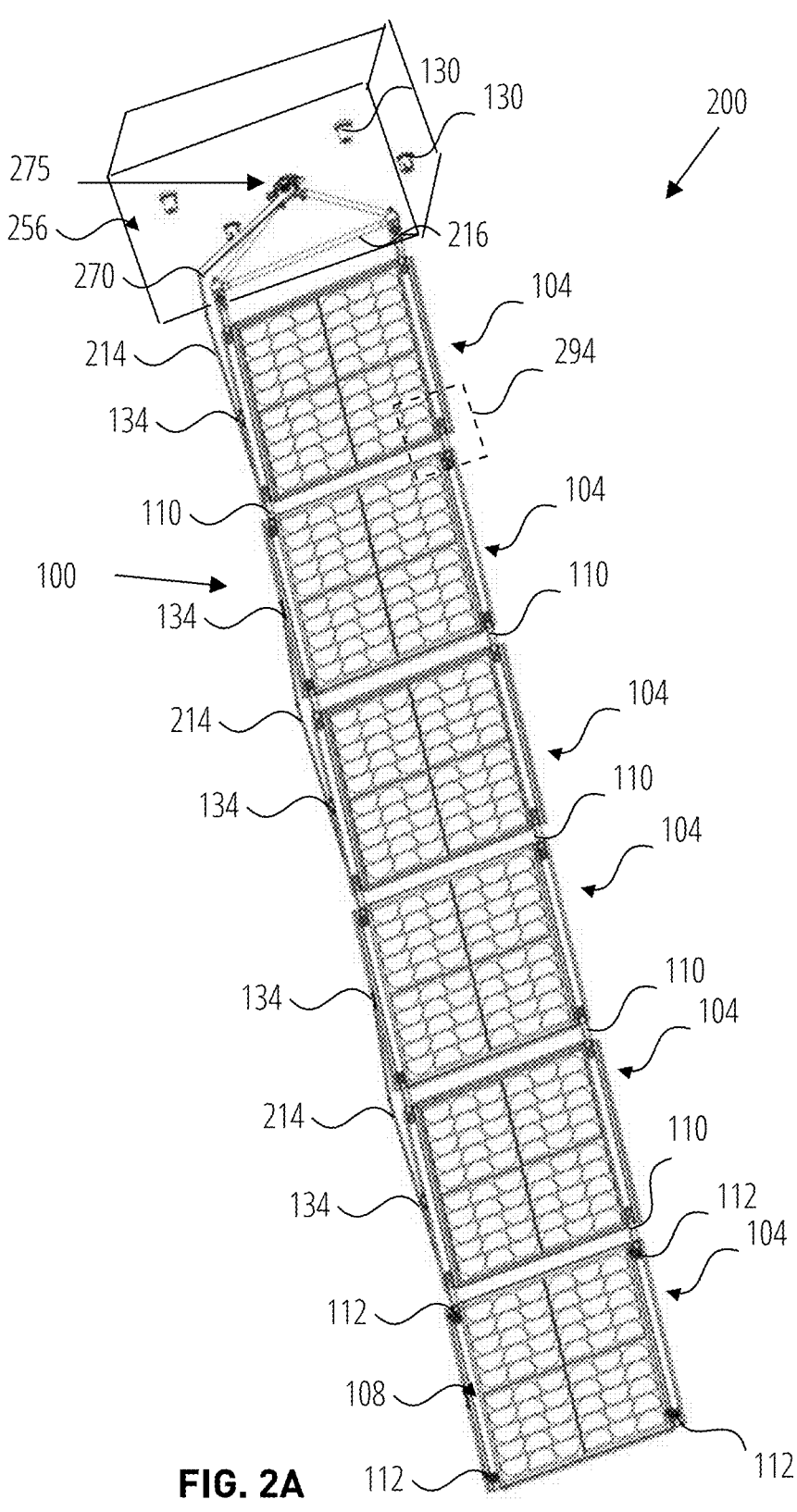
FIG. 2A illustrates a front perspective view of a nested frame solar array system in an unfolded state in accordance with one embodiment.
Figure 2B:
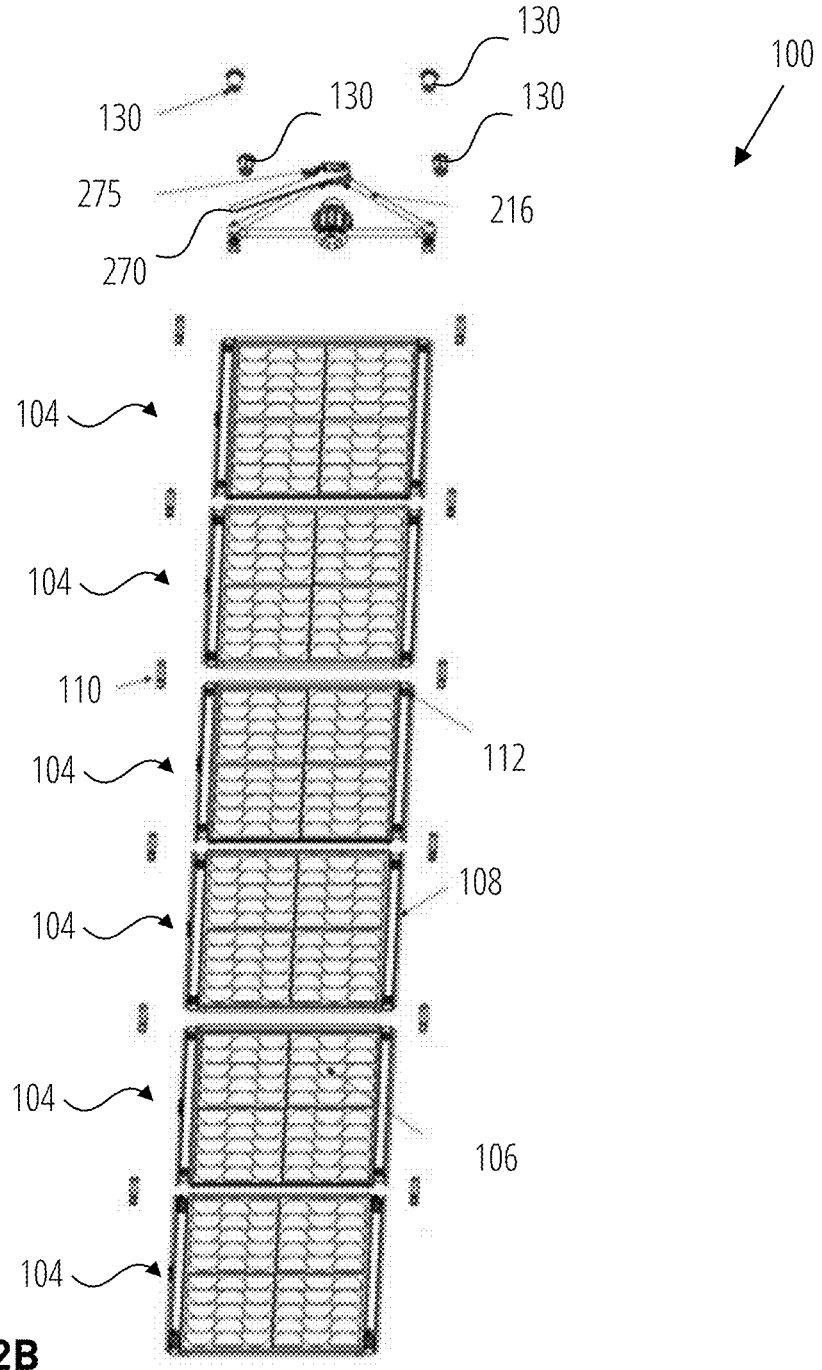
FIG. 2B illustrates an exploded view of a nested frame solar array system of FIG. 2A in accordance with one embodiment.
Figure 2C:
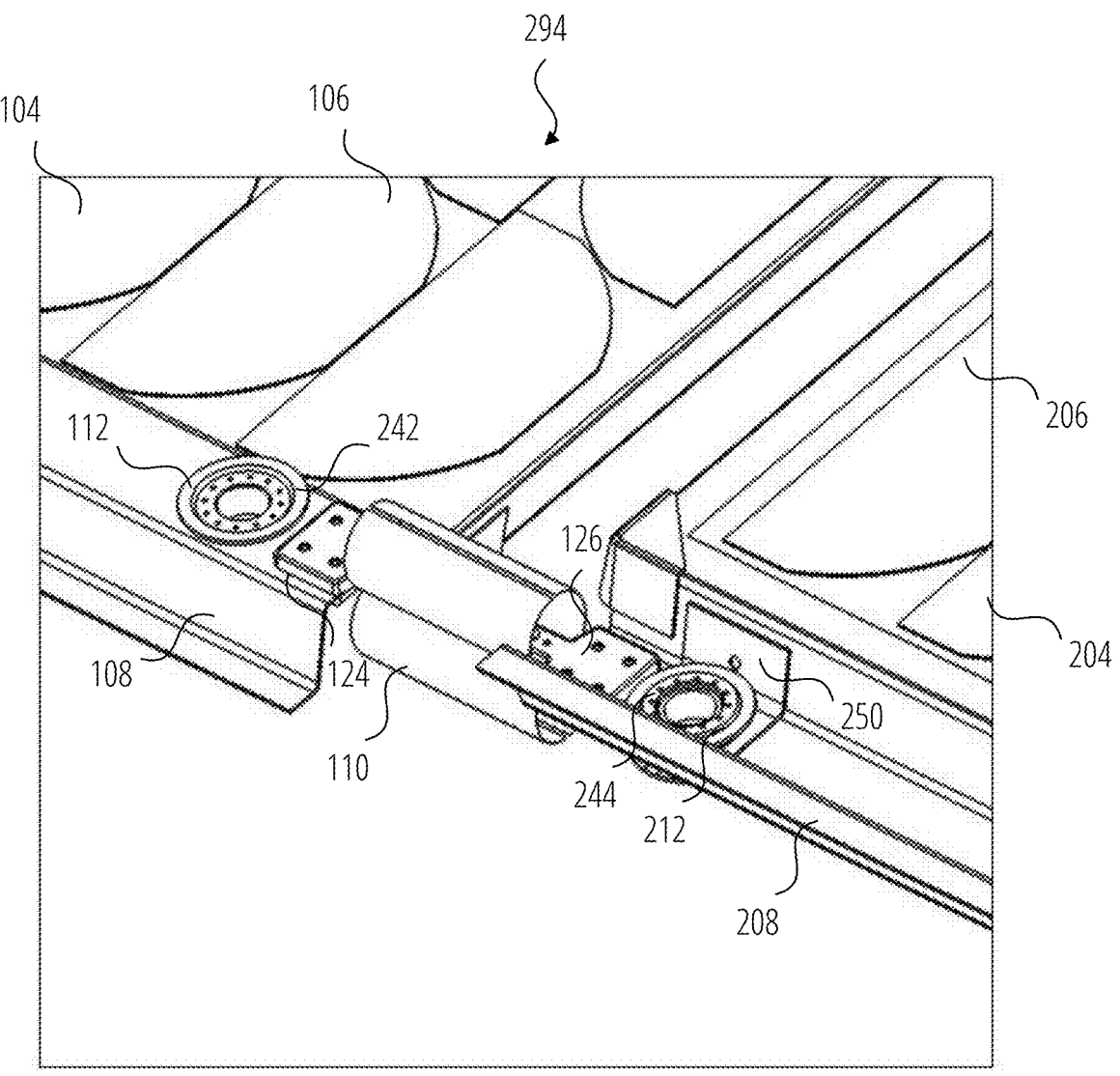
FIG. 2C illustrates a partial view of a spring hinge device connecting adjacent PFAs of FIG. 2A in reference box in accordance with one embodiment.
Figure 2D:
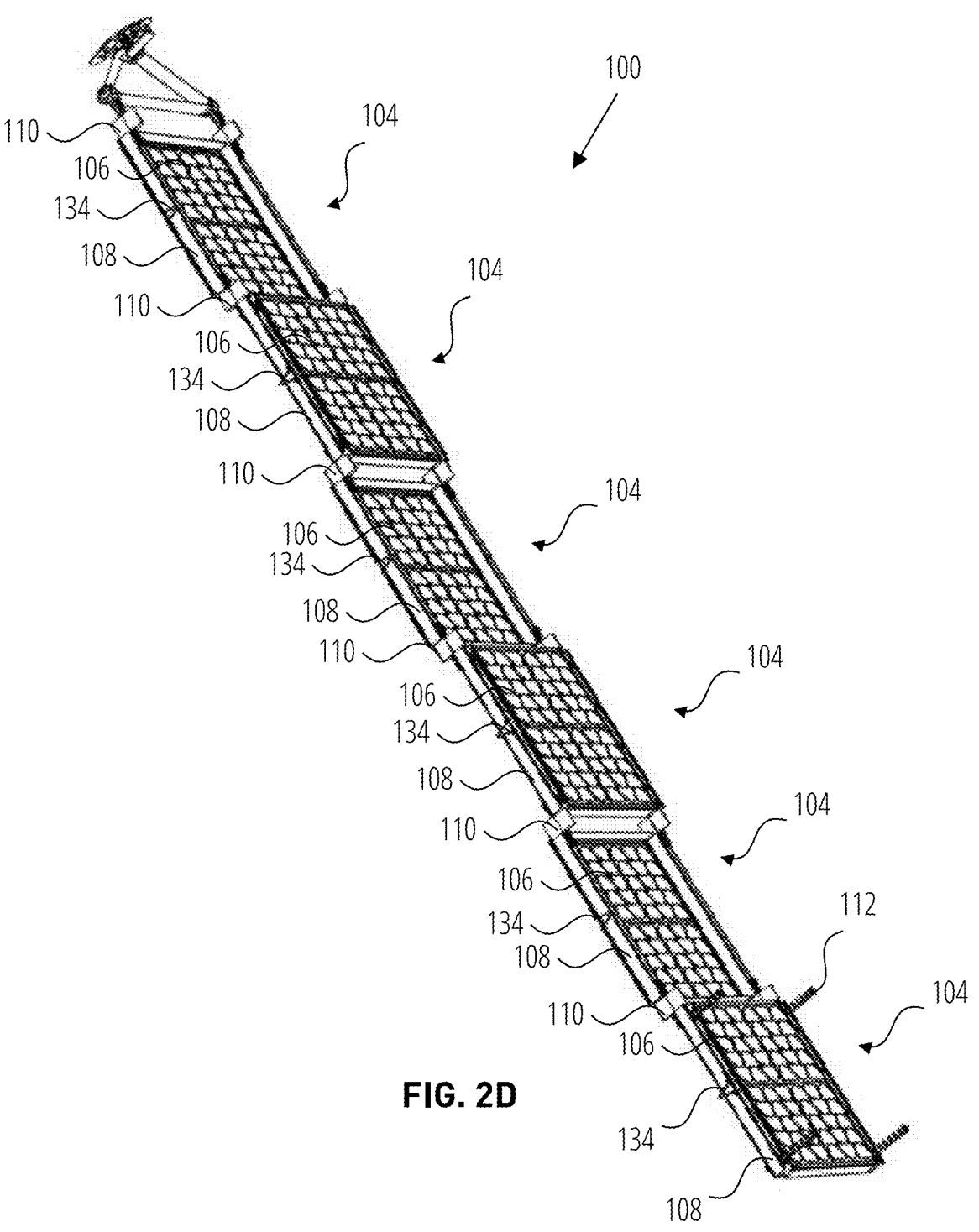
FIG. 2D illustrates a side perspective view of a nested frame solar array system in accordance with one embodiment.

The NFA system 100 may include plurality of Populated Frame Assemblies (PFA) 104 having a folded nested state, as shown in FIG. 1 and an unfolded state, as shown in FIGS. 2A, 2B, and 2D. Each PFA 104 may include a nestable frame assembly 108 and a payload 106 populated in the frame assembly. By way of a non-limiting example, the payload 106 may include photovoltaic elements to form a solar array. The nestable frame assembly 108 will be described in more detail in relation to FIGS. 2C. 3-4, 5A-5B and 6A-6B. As used herein, payload and payload elements may be used interchangeably.

Figure 4:
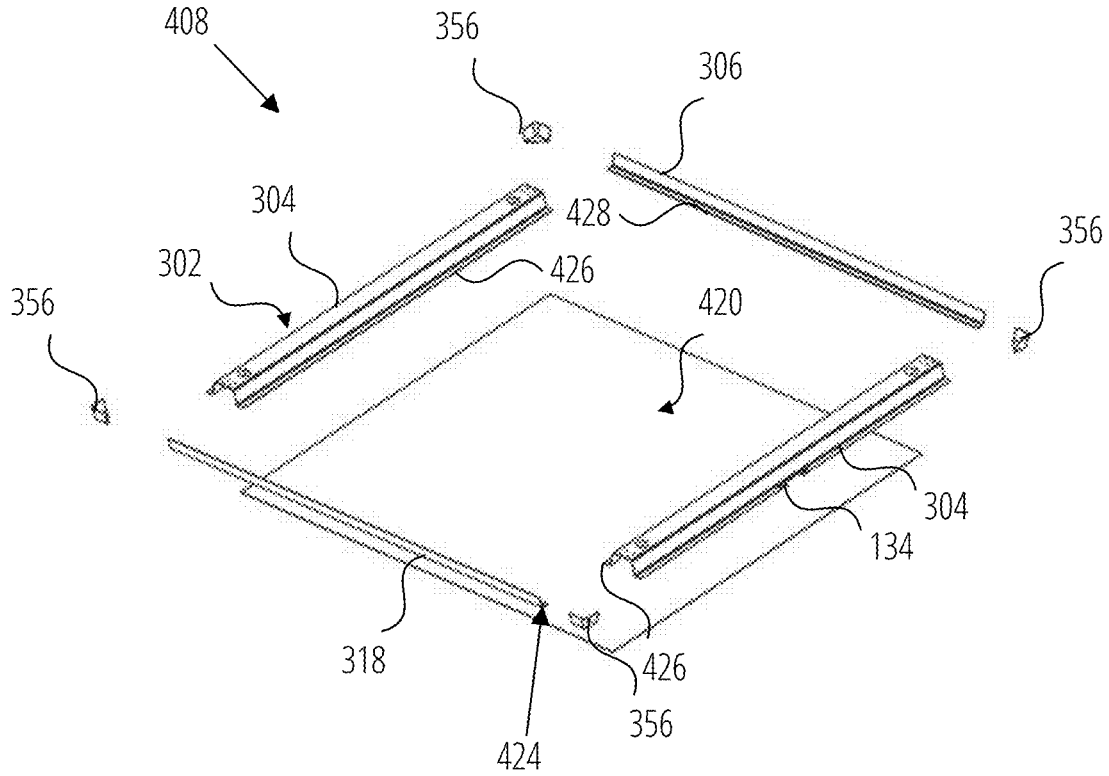
FIG. 4 illustrates an exploded view of a modular frame assembly in accordance with one embodiment.

According to an embodiment, the nestable frame assembly may be modular as shown in FIG. 4.

Figures 5A, 5B:
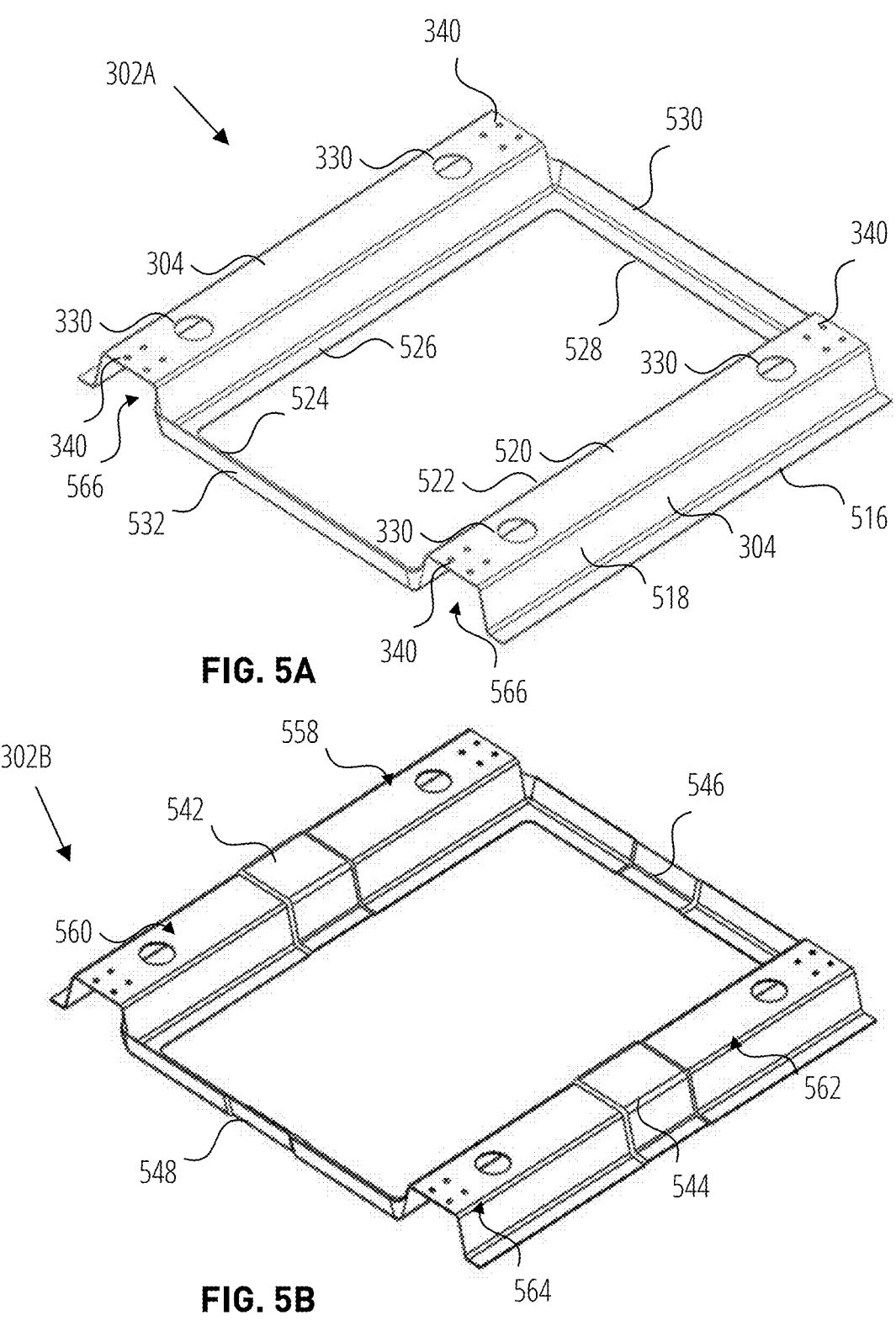
FIG. 5A illustrates a perspective view of a monolithic frame assembly in accordance with one embodiment.
FIG. 5B illustrates a perspective view of an expandable monolithic frame assembly in accordance with one embodiment.

According to an embodiment, the nestable frame assembly may include a monolithic structure as shown in FIGS. 5A and 5B.

Figure 6A:
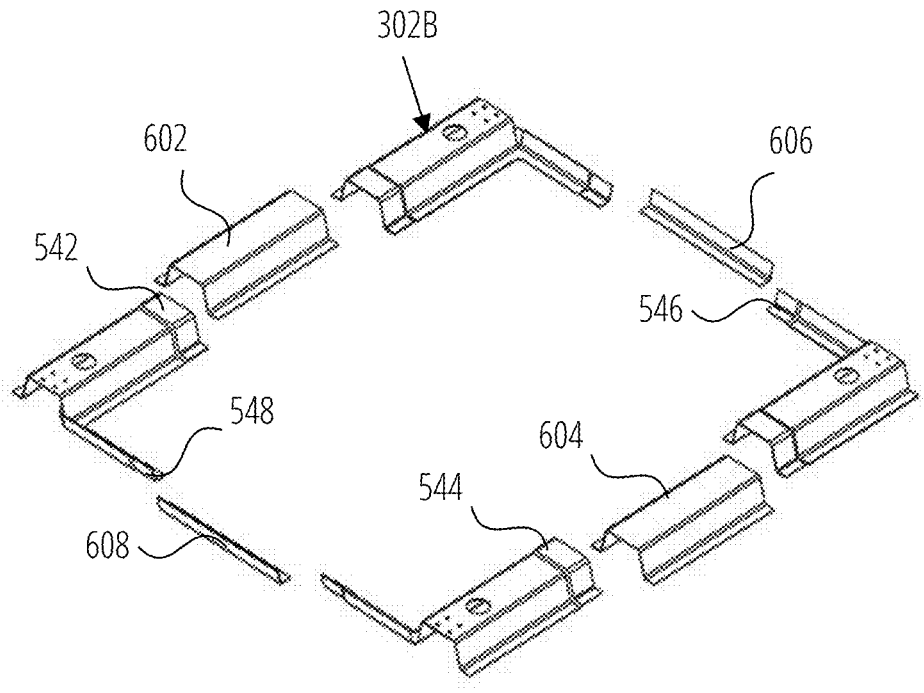
FIG. 6A illustrates a perspective view of a cut expandable monolithic frame assembly with insertable extension frame sections in accordance with one embodiment.
Figure 6B:
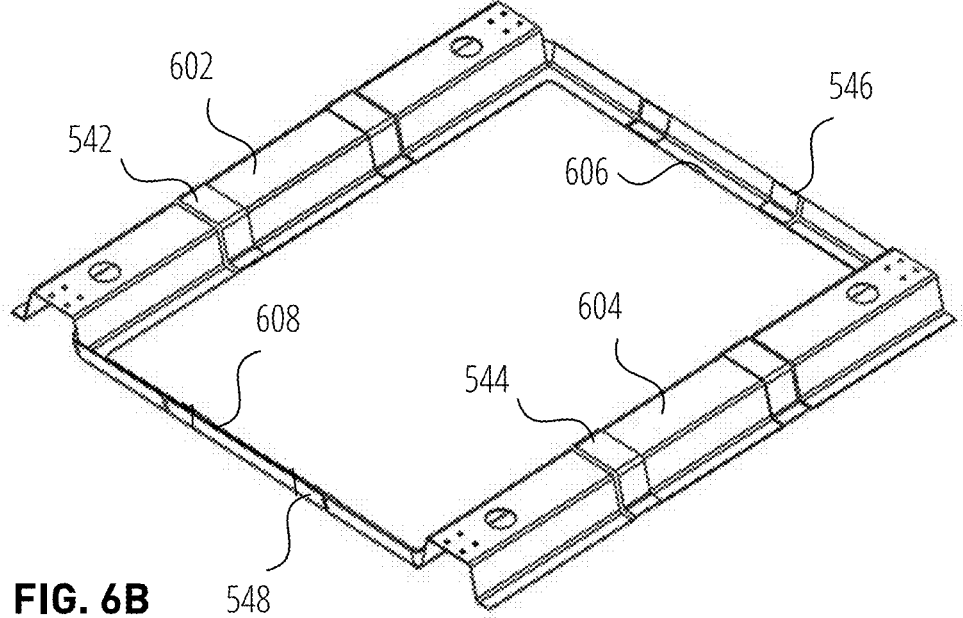
FIG. 6B illustrates a perspective view of an expanded monolithic frame member assembly of FIG. 6A that is assembled in accordance with one embodiment.

According to an embodiment, the nestable frame assembly may include an expandable monolithic structure as shown in FIGS. 6A and 6B with insertable extension frame sections to expand at least one dimension of the frame assembly 108.

Figure 10:
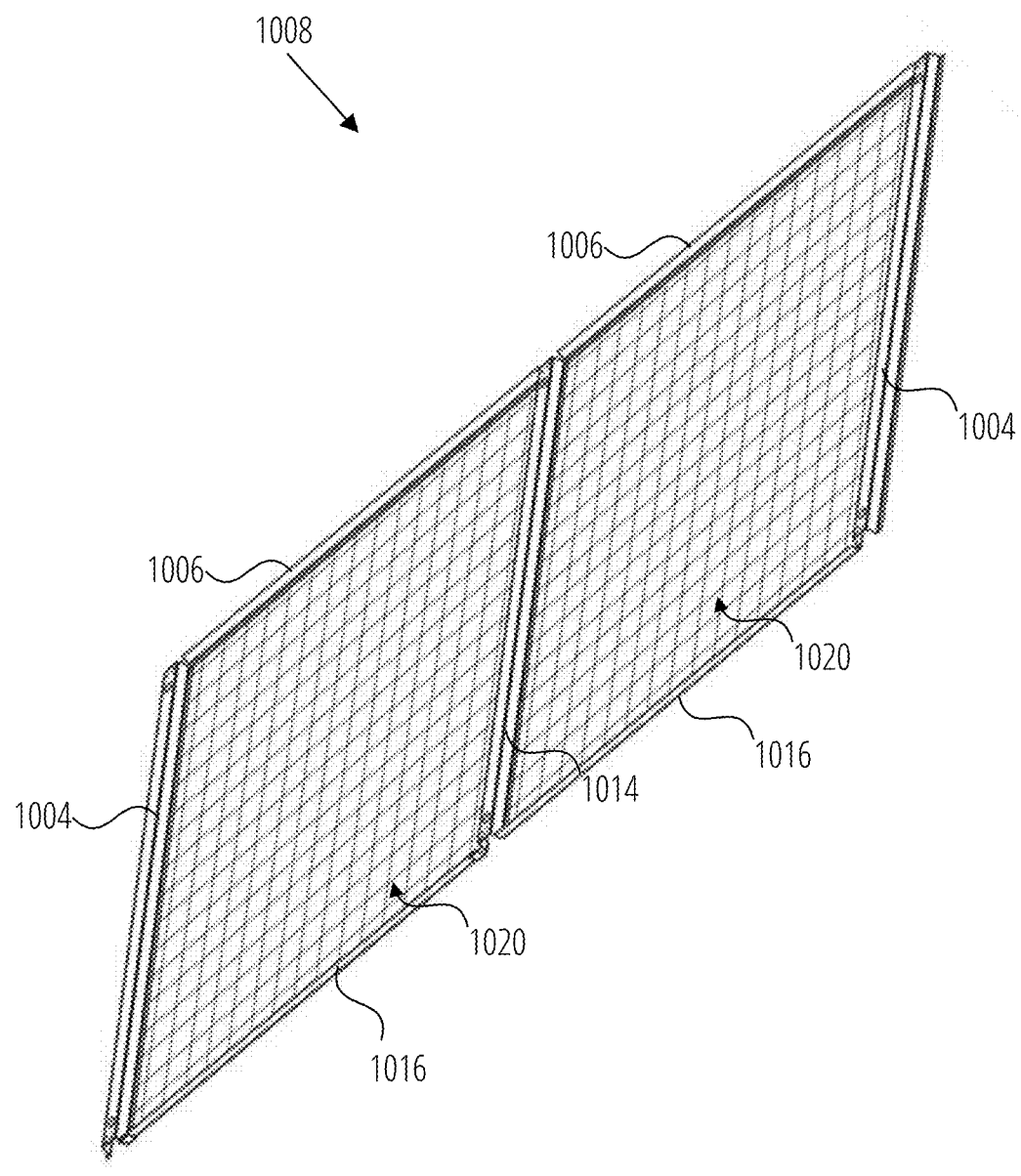
FIG. 10 illustrates a perspective view of a nestable frame assembly with subframes in accordance with one embodiment.

According to an embodiment, the nestable frame assembly may include subframes, as described in relation to FIG. 10.

According to an embodiment, the nestable frame assembly may include parallel NF members where each NF member includes at least one nesting channel, as shown in FIGS. 15A-15H.

According to an embodiment, the nestable frame assembly may include parallel NF members where each NF member has a generally constant two-dimensional cross-section along the length of the NF member.

Figure 13:
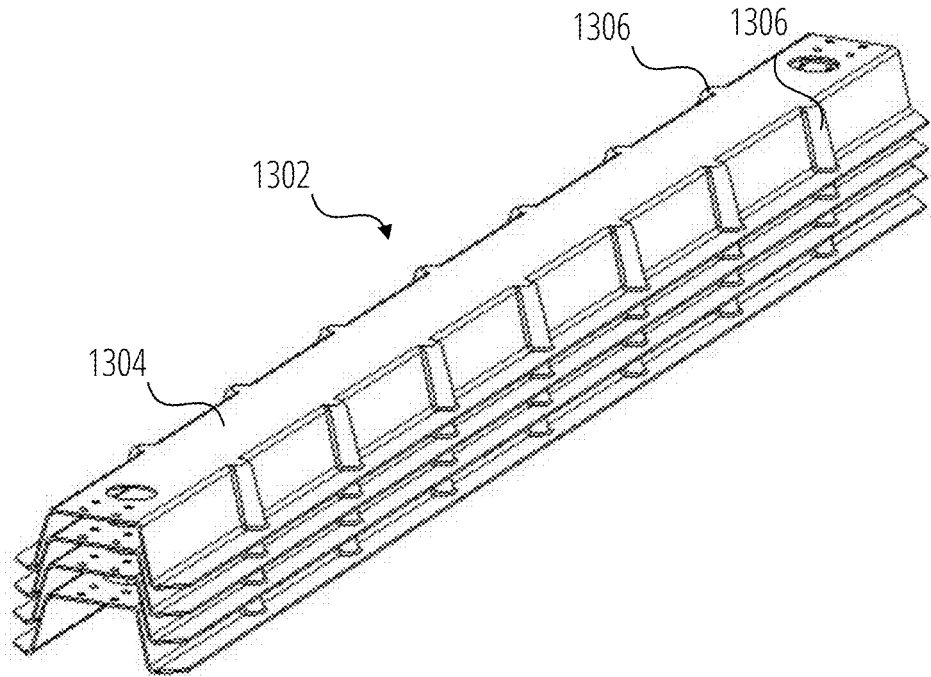
FIG. 13 illustrates a perspective view of a NF member in accordance with an embodiment.
Figure 14:
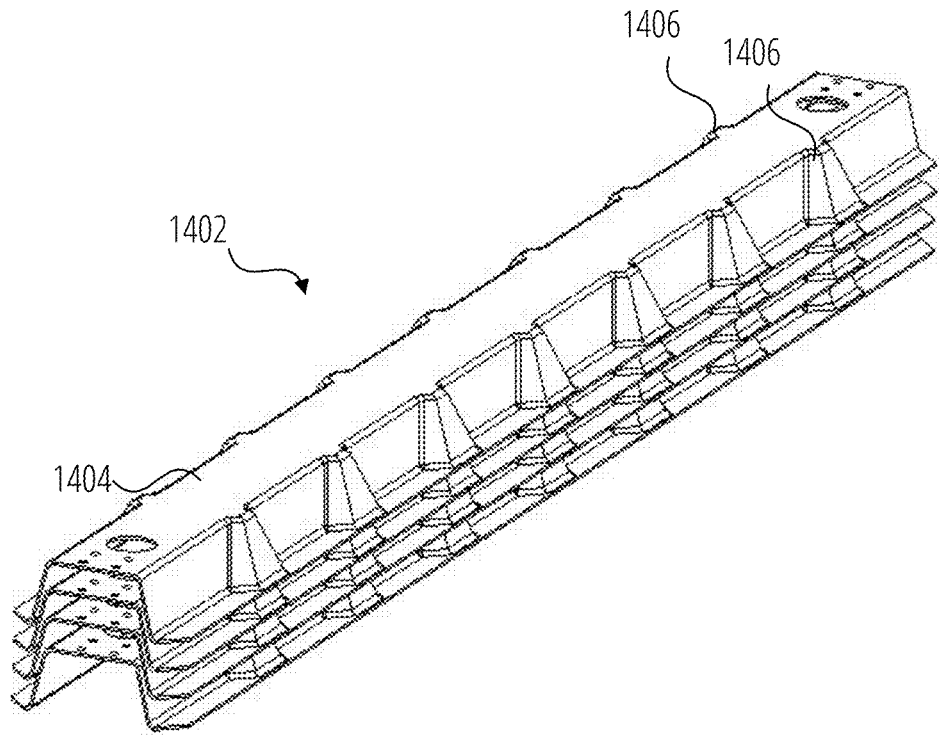
FIG. 14 illustrates a perspective view of another NF member in accordance with an embodiment

According to an embodiment, the nestable frame assembly may include parallel NF members where each NF member that has a two-dimensional (2D) cross-section varies periodically along the length of the NF member, as shown in FIGS. 13 and 14.

Figure 11:
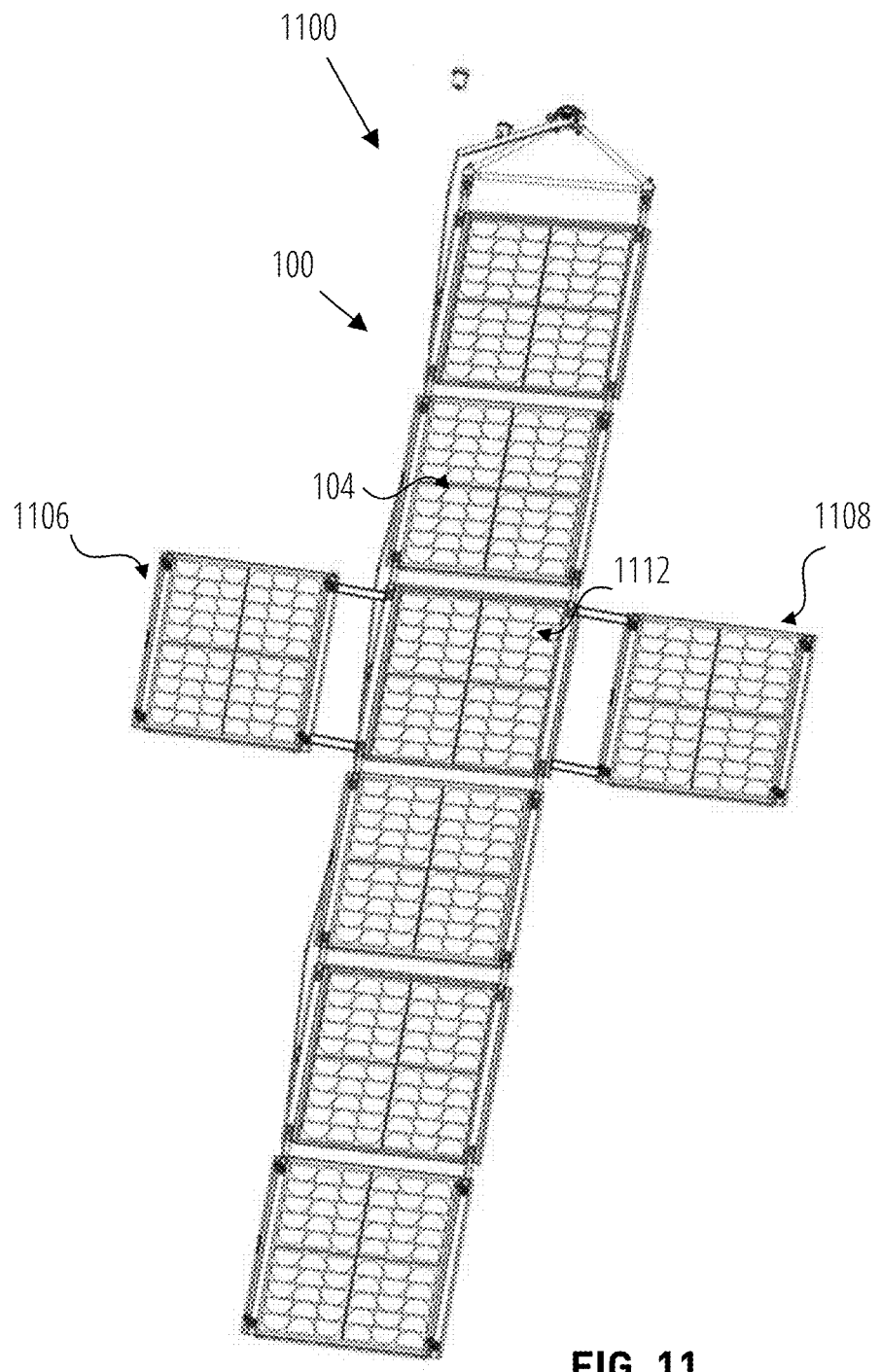
FIG. 11 illustrates a front perspective view of a nested frame solar array system with cross PFAs in an unfolded state in accordance with one embodiment.

According to an embodiment, the nestable frame assemblies can be attached in series, as shown in FIGS. 2A, 2B and 2D, and/or parallel for stowage and deployment, as shown in FIG. 11. As shown in FIG. 2A, the stacked PFAs 104 may be configured to deploy in series, such as, but not limited to, one after the other. As shown in FIG. 11, the stacked PFAs 104 may be configured to deploy in series, such as, but not limited to, in parallel and then continue with series deployment until the series stacked PFAs are all unfolded.

The NFA system 100 may include a plurality of spring hinge devices 110. Each spring hinge devices 110 may be biased to an open position, as shown in FIG. 2A. In FIG. 1, the spring hinge devices 110 are in a closed position when the plurality of PFAs 104 are in the folded nested state. The spring hinge devices 110 may be configured to unfold the plurality of PFAs 104 from the folded nested state to the unfolded state. The plurality of spring hinge devices 110 may include spring hinge sets. Each hinge set may be coupled to opposing parallel sides of the frame assemblies of immediately adjacent PFAs.

The spring hinge device 110 may be a hinge tape spring or lenticular hinge. The high-powered hinge tape spring (i.e., spring hinge device 110) provides a motive force to deploy. In some embodiments, a hinge tape spring may include a curved surface which may provide more stiffness to hold the weight of the PFA to which it is attached and any depending PFAs to maintain the PFAs in a generally linear plane. The spring hinge device 110 will be described in more detail in relation to FIG. 2C.

The spring hinge devices 110 provide flexible elements as connections between the frame assemblies of adjacent PFAs 104. The spring hinge devices 110 provide deployment force from the stowed configuration and provide stiffness when fully deployed.

Although the described embodiment uses spring hinge devices, other unfolding mechanisms may be used to unfold the PFAs. For example, other unfolding mechanisms may be responsive to an electrical control signal to activate the unfolding mechanism to unfold the PFAs.

The NFA system 100 may include one or more hold down and release mechanisms (HDRMs) 112 coupled to the stack of PFAs 104. Each HDRM 112 includes a plurality of cup 242 (FIG. 2C) and cone 244 (FIG. 2C) interfaces, a release actuator 918 (FIG. 9), a tic-down rod 906 (FIG. 9) and associated preload cap 910 (FIG. 9) and nut 908 (FIG. 9), as a non-limiting example. The HDRMs 112 are configured to hold together under compressive force the stacked PFAs 104. By way of non-limiting example, each respective HDRM 112 may be coupled in proximity to the corners of the frame assembly 108.

According to an embodiment, the frame, as shown in FIGS. 3,4, 5A-5B and 6A-6B, may include the cup 242 and cone 244 interfaces, for example. When manufacturing the frame, the cup 242 and cone 244 interfaces may be installed as well as the fitting 250 (FIG. 2C).

The HDRMs 112 may be configured to a) lock or hold the plurality of PFAs 104 in the folded nested state to maintain the plurality of spring hinges in a closed position, when in a lock state; and b) release the plurality of PFAs 104 to unfold by an unfolding force exerted by the plurality of spring hinge devices 110 opening to the open position. The details of an example HDRM 112 will be described in more detail in relation to FIG. 9.

The stowed compression on stack of PFAs 104 through the self-aligning and nesting features of the nestable frame assembly 108 allow the system to survive launch and remain in a stowed/folded nested state. The HDRMs 112 are configured to apply compression on the nestable frame assemblies 108 of the stacked PFAs 104.

The NFA system 100 may include a pantograph connection 134 that bisects the outer edge of the frame assembly 108 of one or more PFAs 104, as will be discussed in more detail in relation to FIGS. 2A-2B.

The NFA system 100 may be a modular, scalable, light weight deployable structure for creating a payload surface/an aperture or solar array, for example. When utilized as a spacecraft NFA system, it can be quickly configured to a mission specific point design with minimal non-recurring engineering and then quickly manufactured due to the parallel schedule of electrical and mechanical components. For example, the NFA system may be scaled to design requirements by adding additional PFAs linked by spring hinge devices 110. The NFA system includes a base frame with an attachable membrane that can be used to affix different payload elements, as required. The frame assembly of the NFA system may be expanded in size.

The NFA system 100 may include electrical connections (not shown), such as without limitation, a harness that runs back to a root hinge and to a solar power storage module, for example. In other embodiments, the electrical connection may run back to the root hinge and a payload receiving module to receive light, sound, solar energy by or electromagnetic waves from space collected by the payload elements, for example.

FIG. 2A illustrates a front perspective view of the NFA system 200 in an unfolded state in accordance with one embodiment. The NFA system 200 includes NFA system 100 as described above in FIG. 1 except it is now fully unfolded and deployed to an unfolded state. Furthermore, the NFA system 200 includes a spacecraft or satellite 256 to which the NFA system 100 is attached.

In FIG. 2A, at least one PFAs 104 disposed at one end of a stack of PFAs can be coupled via satellite connector 275 to a base section of the spacecraft or satellite 256. The electrical connections from the payload, such as photovoltaic elements, deliver payload signals to the satellite connector 275, such as a root hinge. As a point of reference, the first PFA of the stack of PFAs is shown affixed to the spacecraft or satellite 256.

As shown, the release actuator housings 130 is shown dislodged from the HDRMs 112. In order for the stack of PFAs 104 to unfold, the HDRMs 112 have to be unlocked to release the PFAs 104 so that the PFAs 104 can unfold under the motive force of the spring hinge devices 110.

The NFA system 100 may include a pantograph deployment system 270 to link pairs of PFAs together. The pantograph deployment system 270 may include mechanical linking member 214. The mechanical linking member 214 may link together two adjacent PFAs 104. More specifically, a mechanical linking member 214 may be connected to a pantograph connection 134 of the frame assembly 108 of each PFA of the pair being linked together.

In this illustration, the PFA 104 closest to the spacecraft or satellite 256 is coupled to a mechanical linking member 214 that links the first PFA to the spacecraft or satellite 256. The next mechanical linking member 214 links the second and third PFAs 104 to each other by connecting and linking the frame assembly 108 of the second and third PFAs relative to the first PFAs. The fourth and fifth PFAs 104 may be linked together via another mechanical linking member 214 by connecting and linking the frame assembly 108 of the fourth and fifth PFAs relative to the first PFA.

Referring also to FIG. 2B, which illustrates an exploded view of a NFA system 100 of FIG. 1 in accordance with one embodiment. The NFA system 100 is shown with six PFAs 104. However, the system 100 is modular and configured to increase or decrease the number of PFAs 104. Increasing the number of PFAs or increasing the dimensions of the frame assembly 108 can increase the number of payload 106 carried by each frame assembly 108.

Still referring to FIGS. 2A and 2B, the system 100 may include a yoke 216 including support members that form the yoke. The yoke 216 may include an apex for mounting thereto the satellite connector 275, such as a solar array root hinge. The yoke 216 may include a connection to attach the pantograph deployment system 270.

FIG. 2C illustrates a partial view of a spring hinge device 110 connecting adjacent PFAs 104 of FIG. 2A in denoted reference box 294 in accordance with one embodiment. As will be seen from the description herein, the frame assembly 108 of adjacent PFAs in a stack are opposing so that the frame assembly of immediately adjacent PFAs can be nested together and self-aligned when stacking.

The frame assembly 108 has a first orientation for a first PFA 104. The frame assembly 208 adjacent to frame assembly 108 has a second orientation. As a point of reference the first orientation of the frame assembly 108 is upright or top-side up. As a point of reference the second orientation the frame assembly 208 of the second PFA 204 is reversed or top-side down. The first orientation and the second orientation are opposing orientations when unfolded so that when folded, the frame assemblies of the stack nest together.

The frame assemblies 108 and 208 have channels between opposing surfaces of the first and second longitudinal walls and the top surface. The channels are opposing so that in the folded state, the channels of folded frame assemblies 108 and 208 nest together.

While not wishing to be bound by theory, the nesting feature may serve to maintain the stack of frame assemblies aligned and compressed together under vibration forces due to launching the satellite. This stack of nested frame assemblies may withstand stronger vibration forces compared to non-nested frame assemblies. The nested frame assemblies maintain alignment so that the hinge devices are not impacted or damaged as would occur by shifts in non-nested frames assemblies.

Frame assembly 108 is essentially identical to frame assembly 208. The "2" in reference numeral 208 denotes second. The PFA 104 is essentially identical to PFA 204. The "2" in the reference numeral 204 denotes second. According to some embodiments, the payload elements 106 may be essentially the same as payload elements 206. The "2" in reference numeral 206 denotes second. The orientation of payload elements 106 and 206 may vary as described below in relation to FIGS. 7 and 8. The HDRMs 112 is in frame assembly 108 which HDRM 212 is in the frame assembly 208. The "2" in reference numeral 212 denotes second. In some embodiments, the frame assemblies may be similar by different sizes.

The spring hinge device 110 may include frame connection tabs 124 and 126. For example, connection tab 124 may connect to holes 340 (FIG. 3) formed in the frame assembly 108. The connection tab 126 may connect to holes 340 (FIG. 3) formed in the frame assembly 208. The hinge tape spring (i.e., spring hinge device 110) has an unfolded to flat profile shown in FIG. 1. However, upon deployment, the hinge tape spring curls to have a curve surface.

The HDRMs 112 are affixed to the stack of frame assembly 108 to secure and hold together the stack of PFAs 104. Components of the HDRM 112 includes a cup 242 coupled to a first side of the mounting hole 330 and a cone 244 coupled to a bottom side of the mounting hole 330 on each NF member of the frame. In FIG. 2C, the cup 242 is shown coupled to the top surface of frame assembly 108, shown in the top-side up orientation. The cone 244 is shown coupled to the underside of the frame assembly 208, shown in the top-side down orientation.

Figure 3:
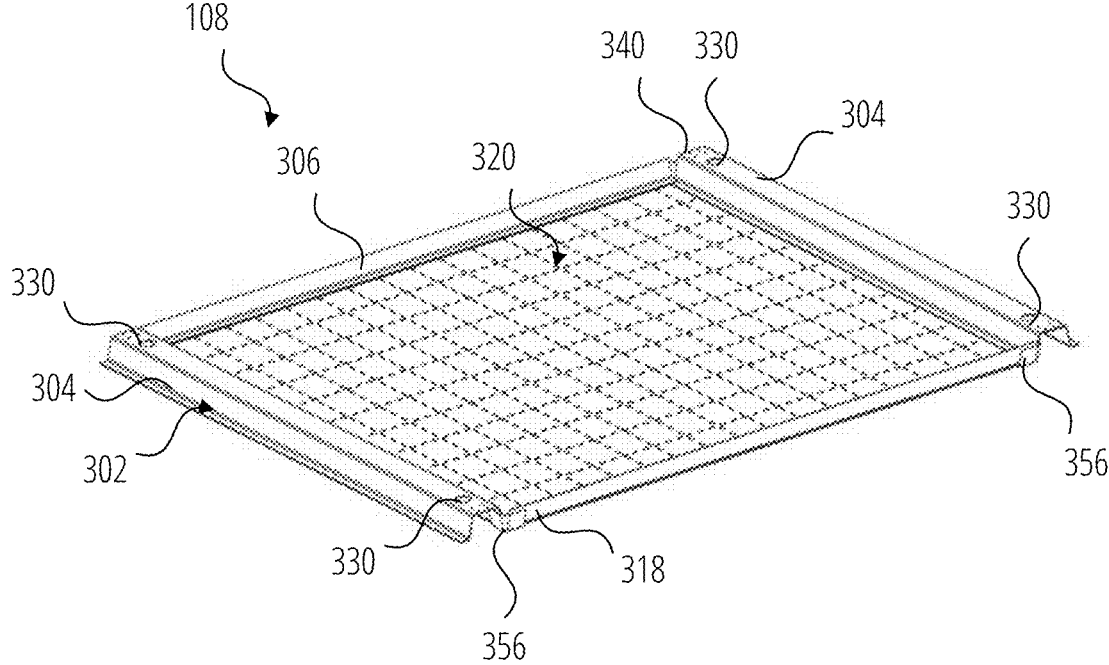
FIG. 3 illustrates a perspective view of a frame assembly in accordance with one embodiment.
Figure 9:
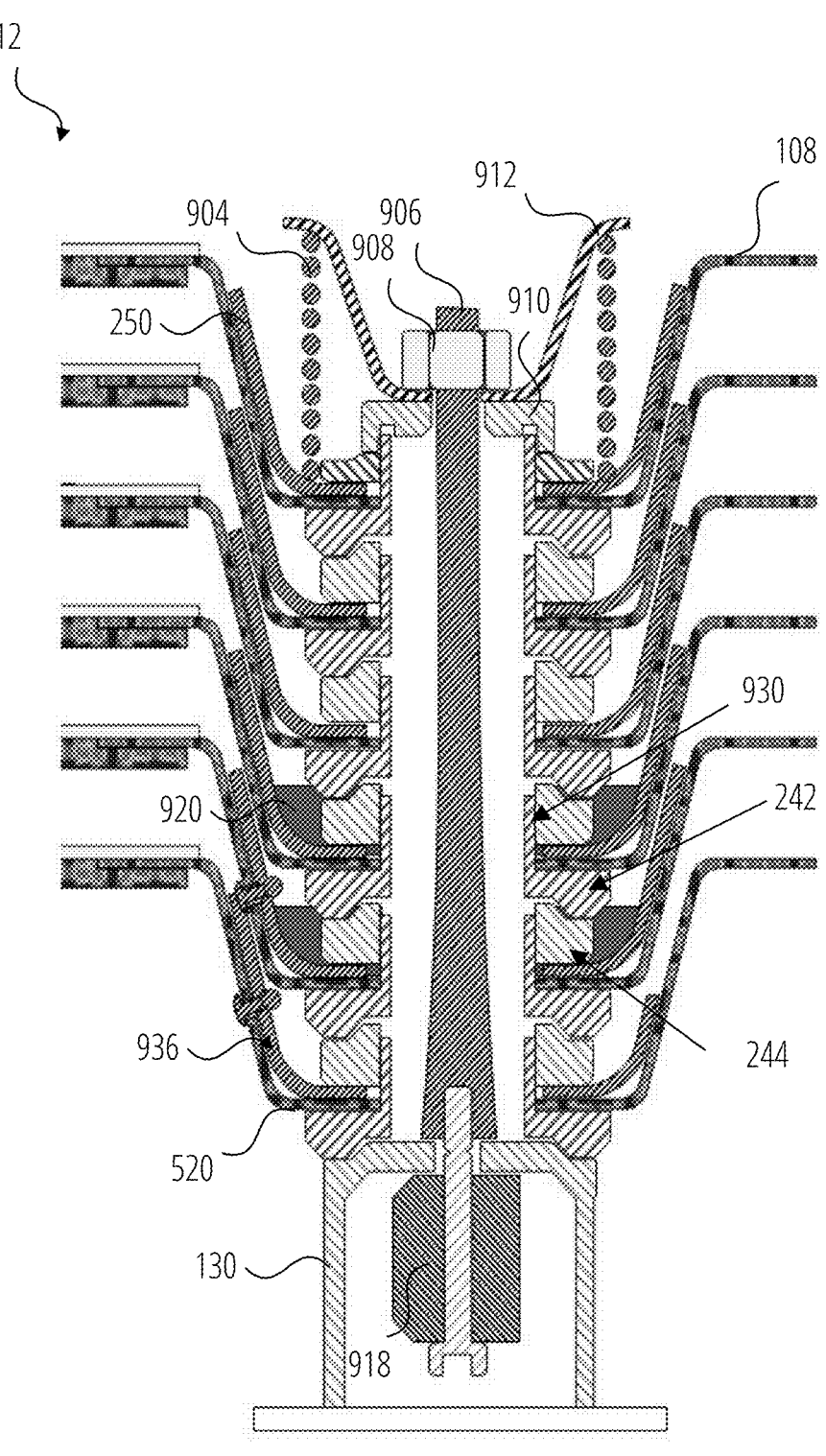
FIG. 9 illustrates a cross section of an ejector spring assembly in a locked state in accordance with one embodiment.

The nesting of frame assembly 208 over frame assembly 108 causes the cup 242 to receive the cone 244. The cone 244 may nest in the cup 242, as shown in FIG. 9. The HDRM 112 may include fittings 250 that lines the undersurface of frame assembly 108. As shown in FIG. 9, the cup 242 has a second diameter and second center axis, which aligns with the first center axis of mounting hole 330 (FIG. 3). The cone 244 is coupled to a second side of the frame assembly and has a third hole having a third diameter and a third center axis aligned with the first center axis and the second center axis. The mounting hole 330 is formed in the self-aligning, nestable frame (NF) members 304 (FIG. 3).

FIG. 2D illustrates a side perspective view of a NFA system 100 in accordance with one embodiment. The side view of the PFAs 104 shows the pantograph connection 134 in each frame assembly 108. Each frame assembly 108 has mounted thereto a payload 106. A side view of the spring hinge devices 110 are shown as describe above in relation to FIG. 2C. As shown, the heights of the PFAs relative to adjacent PFAs 104 is staggered.

In FIG. 2D, the last PFAs 104 (i.e., the sixth PFA) farthest from the yoke 216 may have components of the HDRMs 112 radiating from the frame assembly 108.

The frame assembly 108 will be described in combination with FIGS. 3-4, 5A-5B and 6A-6B.

FIG. 3 illustrates a perspective view of a frame assembly 108 in accordance with one embodiment. According to some embodiments, the frame assembly 108 may be stackable. The frame assembly 108 may include a nestable frame 302, which has self-aligning, nestable frame (NF) members 304 on first parallel and opposing sides of the frame assembly 108. The frame 302 may include a first traverse frame member 306 coupled perpendicularly to free ends of the NF members 304 by the gussets 356 and fasteners or adhesive, for example. The frame 302 may include a second traverse frame members 318 parallel to first traverse frame member 306 and coupled perpendicularly to opposing free ends the NF members 304 by the fasteners 356. At least one of the first traverse frame member 306 and the second traverse frame member may provide a vertical wall.

Each NF member 304 has one or more holes 340 in on opposite ends of the NF member 304. The holes 340 are used to connect to a respective spring hinge device 110, as shown in FIG. 2C. Each NF member 304 has a mounting holes 330 for the cup and cone interfaces on opposite ends of the NF member 304 adjacent to the holes 340, for example. The holes 340 receive fasteners to fasten the tabs of the hinge device. The mounting holes 330 may provide a first hole having a first diameter and a first center axis. The HDRM 112 is attached to and through the mounting holes 330 on each stacked frame assembly 108, as described in relation to FIG. 9.

According to some embodiments, the frame assembly 108 may include a membrane 320 configured to bond, mount or affix payload elements thereto, for example. By way of non-limiting example, the membrane 320 may be tensioned, semi-rigid, rigid, or otherwise, a mechanism for affixing the photovoltaic elements.

According to an embodiment, the membrane 320 may have a scrim configuration. The photovoltaic elements or other payload elements may be attached to the membrane 320 using an epoxy, bonding material, or adhesive, for example.

According to an embodiment, the membrane 320 may be an open weave or mesh that accommodates reliable and simple secure attachment of the photovoltaics elements/payload elements offering a stream-lined manufacturing approach and acceptance of a lower-cost photovoltaic/payload configuration.

The self-aligning NF members 304 are nestable members so that each frame assembly 108 of system 100 can nest within the neighboring frame assemblies within the stack. The self-aligning NF members 304 may be configured to align NF members 304 of an immediately adjacent frame assembly. The NF members 304 are unique in that when stowed they stack in a nesting, self-aligning manner providing a low profile stack with a high stiffness structure. The stiffness of the deployed structure is therefore not proportional to the total stowed stack height of the NF members 304 but the individual NF member cross-section.

Figure 7:
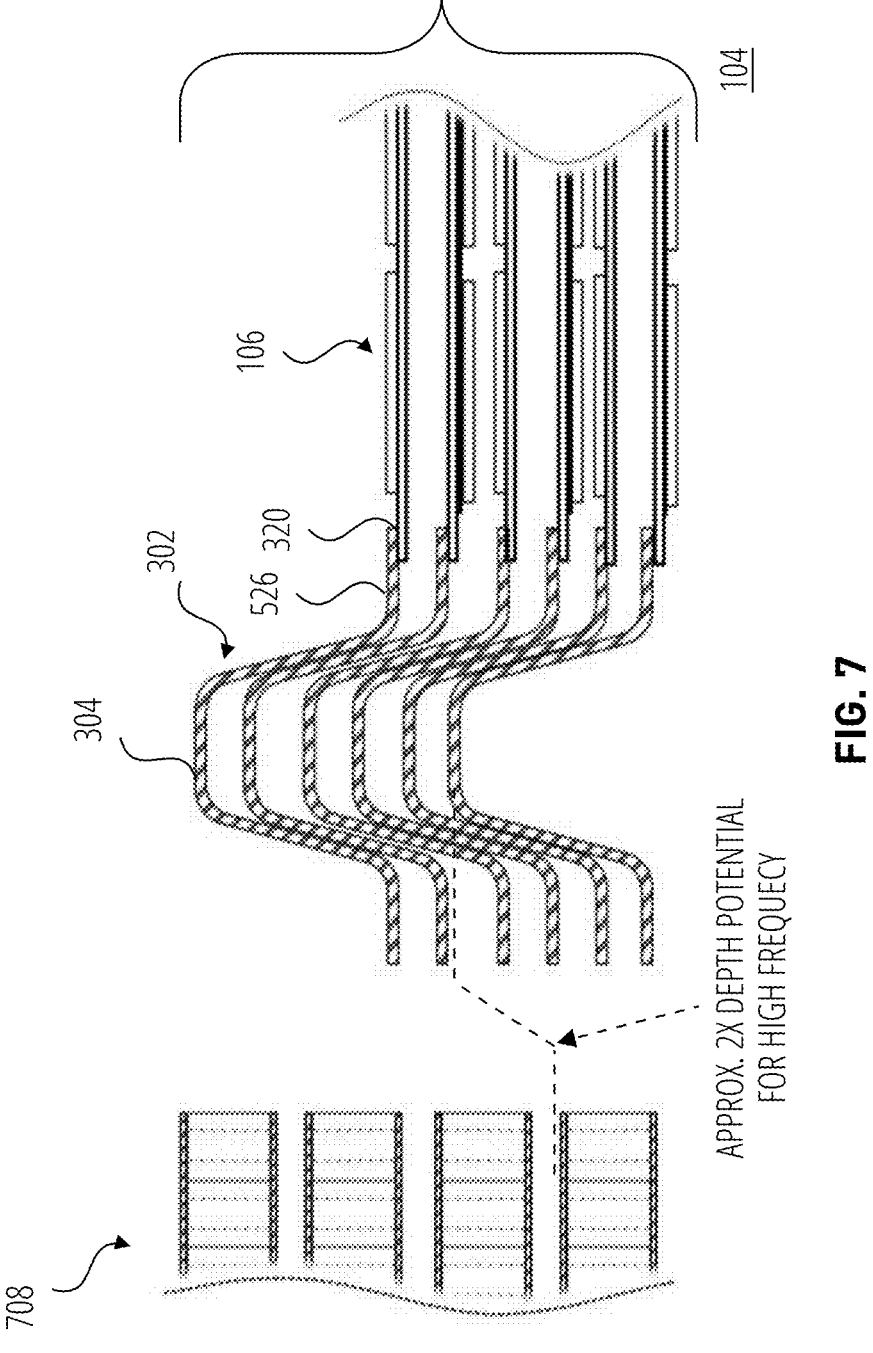
FIG. 7 illustrates a partial end view of a nested populated frame arrays with six PFAs in a folded nested state in accordance with one embodiment.
Figure 8:
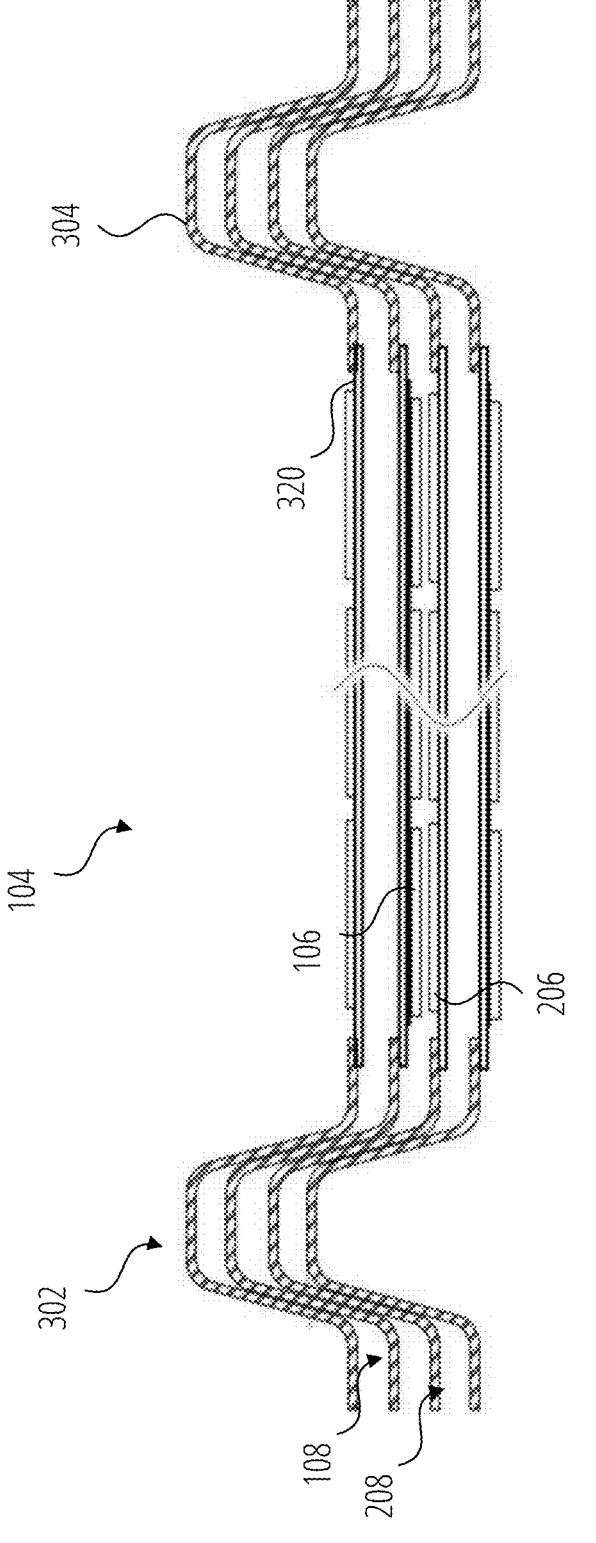
FIG. 8 illustrates an end view of a cross section of a nested populated frame arrays with four PFAs in a folded nested state in accordance with one embodiment.

According to an embodiment, the NF members 304 have a seat to which the membrane 320 is affixed. The frame has a recess in a center of the frame configured to allow a next frame of a next PFA to nest in the recess when stacked. The membrane 320 allows the payload elements to be mounted the top side of the seat or an underside of the seat, as shown in FIGS. 7 and 8. Accordingly, the payload elements may be directed below the seat, up through the seat or above the seat.

FIG. 4 illustrates an exploded view of a modular frame assembly 408 (i.e., frame assembly 108) in accordance with one embodiment. The modular frame 302 allows the components including the NF members 304, the first traverse frame member 306, and the second traverse frame member 318 to be interconnected by fasteners 356. The fasteners 356 may be corner gussets. According to some embodiments, the height of the first traverse frame member 306 and the second traverse frame member 318 is lower than the height of any NF member 304 so that the stacking and nesting are not interfered with.

According to some embodiments, the membrane 420 may be a face sheet or film with or without light weight features. The membrane 420 (i.e., membrane 320) may be an open weave or mesh according to some embodiments, an example shown in FIG. 3. The membrane 420 may be affixed to base feet of NF members 304. The interior base feet are denoted by reference number 426 on NF members 304, reference number 424 on the second traverse frame members 318, and reference number 428 on the first traverse frame member 306. When the modular frame 302 of the frame assembly 408 are coupled or affixed together, the interior base feet 426, 424 and 428 collectively form a seat for affixing the payload elements, such as via the membrane. In some embodiments, the seat is an opening within the interior of the frame members of the frame 302.

By way of non-limiting example, the membrane may be 3 meters×2 meters. However, increasing the size of the membrane may increase the number of payload elements capable of being affixed to the frame assembly. As will be described in FIG. 6A-6B, the frame assembly may be extended in at least one dimension.

FIG. 5A illustrates a perspective view of a monolithic frame 302A in accordance with one embodiment. The frame 302A is similar to frame 302 described in FIGS. 3 and 4. Therefore, only the differences will be described.

According to an embodiment, the monolithic frame 302A includes self-aligning NF member 304 on lateral sides of the frame 302A. The monolithic frame 302A may include a first traverse frame member 530 and a second traverse frame member 532 that are parallel and integrated with free ends of NF members 304. In the embodiment of FIG. 5A, the fasteners 356 may be omitted.

The interior base feet (only feet 524, 526, and 528 shown) form the seat of the frame 302A for attachment of the monolithic membrane 320 or 420. In some embodiments, the membrane 320 or 420 may be affixed to the underside of the base feet with the payload elements mounted to project outward from the seat. In some embodiments, the membrane 320 or 420 may be affixed to the underside of the base feet with the payload elements mounted to project through the seat. In some embodiments, the membrane 320 or 420 may be affixed to the topside of the base feet with the payload elements mounted to project outward from the seat. In some embodiments, the membrane 320 or 420 may be affixed to the topside of the base feet with the payload elements mounted to project upward from the seat.

Each self-aligning NF member 304 may include a top surface 520 having a longitudinal length and a first (exterior) longitudinal side and a second (interior) longitudinal side that are opposing and parallel. The self-aligning NF member 304 may include first and second longitudinal walls 518 and 522 that are non-parallel and have equal height. The first longitudinal wall 518 may have a top side or edge depending from the first longitudinal side. The second longitudinal wall 522 may have a top side or edge depending from the second longitudinal side of the top surface 520. The distance between the bottom side of the first and second longitudinal walls relative to the interior surfaces facing each other, is larger a width of the top surface 520.

The interior base foot 526 extends radially from a bottom side of the second longitudinal wall 522 toward the interior of the frame 302A. Each NF member 304 includes a channel 566, which is formed from the underside of the top surface 520 and between the interior surfaces of longitudinal walls 518 and 522 down to the base feet 516 and 526. The channels 566 of the NF member 304 stack or nest together.

The first traverse frame member 530 includes a wall portion perpendicular to the first and second longitudinal walls 518 and 522. The bottom edge of the first traverse frame member 530 has an interior base foot 528 that extends radially from the bottom edge toward the interior of the frame 302A. The second traverse frame member 532 includes a wall portion perpendicular to the first and second longitudinal walls 518 and 522. The bottom edge of the second traverse frame member 532 has interior base foot 524 that extends radially from the bottom edge toward the interior of the frame 302A. The first and second longitudinal walls 518 and 522 are sloped with opposing slope orientations where the width between the base foot 516 and foot 526 of a NF member 304 is wider than the width of the top surface 520.

The top surface 520 has mounting holes 330 at opposing ends of the NF members 304. The top surface 520 has through holes 340 formed therein. The holes 340 are coupled immediately adjacent to the ends of the top surface 520. The mounting holes 330 follow the holes 340 on the top surface 520.

FIG. 5B illustrates a perspective view of an expandable monolithic frame 302B in accordance with one embodiment. According to an embodiment, the monolithic frame 302A is similar to the expandable monolithic frame 302B. Therefore, only the differences will be described.

According to an embodiment, the monolithic frame 302A may be cut in half or in quarters. For example, cutting the frame 302A into quarter provides corner frame sections, such as sections 558, 560, 562 and 564. Cutting the frame in half may provide a first frame half that includes combined sections 558 and 560 and a second frame half that includes combined sections 562 and 564. Alternately, the first frame half may include combined sections 558 and 562 and the second frame half may include combined sections 560 and 564.

The self-aligning NF members 304 may have expansion joints 542 and 544, which may be integrated in the monolithic structure. According to some embodiments, the expansion joints 542 and 544 are formed by etching lines to define the joint width in top surface and side walls of the NF members 304. The expansion joints 542 and 544 may be aligned and paired. The first traverse frame member 530 may have expansion joints 546. According to some embodiments, the expansion joint 546 may be formed by etching lines in the wall of the frame member 530 to define the width of the joint 546. The second traverse frame member 532 may have an expansion joint 548. According to some embodiments, the expansion joint 548 may be formed by etching lines in the wall of the frame member 532 to define the width of the joint 548. The expansion joints 546 and 548 are aligned and paired.

In operation to expand the monolithic frame 302B on the fly, at least one pair of the expansion joints can be split in half, for example, so that an extension frame section can be inserted as shown in FIG. 6A.

FIG. 6A illustrates a perspective view of a cut expandable monolithic frame 302B with insertable extension frame sections 602, 604, 606 and 608 in accordance with one embodiment. FIG. 6B illustrates a perspective view of an expanded monolithic frame member of the frame member assembly of FIG. 6A that is assembled in accordance with one embodiment.

According to an embodiment, the manufacturing method first makes a small frame with similar construction to the monolithic frame variant. Then, small frame can be cut in the center of its members and expanded in size with longitudinal and/or cross section frame members of required length.

FIGS. 6A and 6B show the method steps for expanding the expandable monolithic frame 302B for the manufacture of a PFA for the stacked PFAs of the system 100.

In FIG. 6A, the expansion joints 542 and 544 are shown cut in half. The cuts may be aligned when cut. The expansion joints 546 and 548 are shown cut in half. In FIG. 6A a first extension frame section 602 is provided that can be inserted between the halves of cut expansion joint 542. A second extension frame section 604 is provided, which can be inserted between the halves of cut expansion joint 544. The first and second extension frame sections 602 and 604 may have the same length.

In FIG. 6A a third extension frame section 606 is provided that can be inserted between the halves of cut expansion joint 546. A fourth extension frame section 608 is provided, which can be inserted between the halves of cut expansion joint 548. The third and fourth extension frame sections 606 and 608 may have the same length.

In FIG. 6B, the first, second, third and fourth extension frame sections 602, 604, 606 and 608 may be affixed to the corresponding expansion joint using bonding material or epoxy, for example. The expansion of the expandable monolithic frame 302B can increase at least one of the length and width of the frame assembly to accommodate a membrane that fits in the seat of the expanded monolithic frame 302B.

After the expandable monolithic frame 302B has been expanded as shown in FIG. 6B, the membrane and payload elements may be affixed to the frame assembly. Then, a frame assembly is affixed to an adjacent frame assembly so that the NF members 304 are opposing each other for stacking and nesting together, as shown in FIG. 2C.

FIG. 7 illustrates a partial end view of a nested PFAs 104 in a folded nested state relative to a stack of conventional rigid substrates 708. The stiffness of the deployed array increases proportionally with the height of an individual fame assembly 108, but the total height of the stowed system 100 does not increase proportionally when changing the frame height. This is a feature of the system 100 that out performs state of the art rigid substrate arrays. A deployed stiffness change requiring a 50% taller frame will change the stowed stack height by approximately 16% on a four frame array while the same change on a rigid substrate array will require the stowed stack to also grow 50% in height.

As can be seen, the folded stack of PFAs 104 has a nesting height. The plurality of PFAs 104 has a nesting height when in a folded nested state that is less than a sum of the height of the plurality of PFAs. The height of each PFA is relative to a height of the NF member of a frame. For example, the sum of the height of the NF member of each frame is less than the nesting height of the stacked and nested frames.

In FIG. 7, the illustration shows six stacked PFAs 104 being compared to the height of the conventional rigid substrates 708. The height is relative to the stacked height of NF members 304. In FIG. 7, the payload elements 106 are shown oriented above the membrane 320 on some PFAs and oriented on the bottom of the membrane on other PFAs. The membrane mounting or attachment to the frame 302 is flexible in order to orient the payload elements in a particular direction. In FIG. 7, the membrane 320 is mounted to the underside of the seat (only foot 526 shown).

In general, the inventors have determined that the height of the conventional substrates 808 includes four conventional substrates while the current embodiments accommodate a stack of six PFAs 104 of the NFA system 100 within the same height constraint. This may allow more payload elements to be deployed.

Additionally, the inventors have determined that the volume of four rigid substrates has a height that is larger than the height of four nested PFAs 104. Additionally, the height of the NF member 304 of the frame 302 in the PFA 104 is approximately twice the height of a rigid conventional substrate 708.

According to an embodiment, the six PFAs 104 of the NFA system 100 are frequency matched, for example.

FIG. 8 illustrates an end view of a cross section of a nested PFAs 104, with four PFAs in a folded state in accordance with one embodiment. In this illustration, frame assembly 108 and frame assembly 208 are adjacent to each other, as a frame of reference. The payload elements 106 affixed to frame assembly 108 are directly facing payload elements 206 mounted to the frame assembly 208.

FIG. 9 illustrates a cross section of an HDRM 112 in a locked state in accordance with one embodiment. The system may include four corner HDRMs 112, where FIG. 9 shows a respective one HDRM.

The top surface 520 of the NF members comprises a plurality of mounting holes 330, as shown in FIGS. 3 and 4. The HDRM 112 includes a cup 242 and cone 244 as described above in relation to FIG. 2C. The HDRM 112 may include a release actuator housing 130. Each release actuator housing 130 houses a release actuator 918.

The HDRM 112 may include a tie-down rod 906 aligned with the first, second and third center axes, where the rod 906 is threaded through the mounting hole 330 of each frame assembly and the related cup 242 and cone 244 pair. The cup 242 may include and be integrated with an annular insert 930 which extends within the opening of mounting hole 330 of the corresponding frame member. The annular insert 930 may hold or secure the cone 244 of the same frame assembly.

The HDRM 112 may include a split nut 908 coupled to one end of the rod 906. The nut 908 is configured to receive a current or other initiator to cause the split nut 908 to split. In an embodiment, the split nut 908 may be made of a deformable material that deforms upon activation current to split the material of the nut structure. In some embodiments, the nut 908 may be substituted with a frangible material that can be activated by a control signal.

The HDRM 112 may include a spring retainer 912 coupled to the one end of the rod 906 and secured by the nut 908.

The HDRM 112 may include an ejector spring 904 coupled to the spring retainer 912. A preload cap 910 may be included, which is coupled over the first hole and includes a fourth hole having a fourth diameter dimension to receive the one end of the rod 906. A portion of the spring retainer 912 is sandwiched between the nut 908 and the preload cap 910.

The HDRM 112 may include a doubler bathtub style variant 920. The doubler bathtub style variant 920 may be positioned between in inner bottom surface of the NF member 304 and the cone 244 of one or more frame members.

The HDRM 112 may include a doubler/fitting with sheet metal 936 affixed with rivets.

FIG. 10 illustrates a perspective view of a nestable frame assembly 1008 having a subframes in accordance with one embodiment. The frame assembly 1008 may include first and second self-aligning NF members 1004 (i.e., NF members 304) on the first parallel and opposing sides of the frame assembly 1008. The frame assembly 1008 may include a third self-aligning NF member 1014 parallel to and between the first and second NF members 1004.

The nestable frame assembly 1008 may include first traverse frame members 1006 coupled perpendicular to free ends of the NF members 1004 and 1014. The frame assembly 1008 may include the second traverse frame member 1016 coupled perpendicular to the other free ends of the NF members 1004 and 1014.

According to an embodiment, the subframes may share a NF member. According to an embodiment, the subframes may share a traverse frame member.

The frame assembly 1008 may include two subframes, each subframe has its own seat. The first seat is between the first and third self-aligning NF members 1004 and 1014. The second seat is between the second and third self-aligning NF members 1004 and 1014 such that the first seat and second seat are parallel. A membrane 1020 is mounted to the first seat between first and third NF members 1004 and 1014. A first membrane 1020 is mounted to the first seat. A second membrane 1020 may be connected to the second seat.

Each of the NF members 1004 on the lateral sides and the center NF member 1014 stack and align with other PFAs having the frame assembly 1008. As shown, the subframes share the center NF member 1014.

In an example of three subframes, another seat and fourth NF member may be added, where the fourth NF member is arranged to be parallel with NF member 1004 and 1014.

Although the embodiments provide for mounting a single type of payloads, the subframes may allow for mounting a different type of payload on a seat of the subframe.

FIG. 11 illustrates a front perspective view of a NFA system 1100 with cross PFAs 1106 and 1108 in an unfolded state in accordance with one embodiment. The NFA system 1100 includes NFA system 100 so only the differences will be described.

The plurality of first PFAs (i.e., PFAs 104) configured to deploy in series. As described above in relation to FIGS. 2A-2B and 2D. The first PFAs includes a support PFA, denoted by the reference numeral 1112.

The NFA system 1100 may include plurality of second (cross) PFAs 1106 and 1108 affixed to lateral sides of the support PFA 1112. The plurality of second PFAs 1106 and 1108 deploy from the support PFA 1112 in a parallel from the support PFA.

As shown in FIG. 11, the stacked PFAs 104 may be configured to deploy in series, in parallel and then continue with linear deployment until the series stacked PFAs 104 are all unfolded.

According to an embodiment, as the number of PFAs 104 in system 100 increases, parallel PFAs, such as cross PFAs 1106 and 1108 may be added to the lateral sides of a particular PFA. By way of non-limiting example, the third PFA is denoted as the support PFA 1112 of six PFAs 104. In a configuration with an odd number PFAs, the support PFA may be the middle PFA of the series to have the second (cross) PFAs 1106 and 1108 attached.

According to an embodiment, in the folded state, the cross PFA 1106 may fold and stack on top of PFA 1112. The cross PFA 1108 may fold and stack under the PFA 1112. The stacking and folding of the PFAs 1106 and 1108 should not interfere with the pantograph deployment system 270 (FIG. 2A). In this configuration, the length of the hinge devices need to accommodate the added height of the cross PFAs 1106 and 1108.

According to an embodiment, the cross PFA 1106 may be part of a plurality of PFAs similar to PFAs 104, which extend from cross PFA 1106. These PFAs may deploy in series from cross PFA 1106 but perpendicular to PFAs 104. The cross PFA 1108 may be part of a plurality of PFAs, which extend from cross PFA 1108. These PFAs may deploy in series from cross PFA 1108 but perpendicular to PFAs 104.

By way of non-limiting example, the cross PFAs extending from cross PFA 1106 and 1108, may stack and fold in a similar manner as described above in relation to FIGS. 1, 2A, 2B, and 2D.

The embodiments herein provides an improved solution for constructing flat-pack solar arrays for the small satellite market so that the flat-pack solar array withstands the external launch forces.

FIG. 12 illustrates a method 1200 of manufacturing a stackable frame payload array according to an embodiment. The method may be performed in the order shown or a different order. One or more of the blocks may be performed contemporaneously. In some embodiments, one more of the blocks may be omitted.

FIG. 12 illustrates an example routine for summary. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes forming a frame having a frame with self-aligning NF members of a frame assembly, at block 1202. Example frames are shown in FIGS. 3, 4, 5A-5B and 6A-6B. Example NF members of the frame are shown in FIGS. 13-14 and 15A-15H. In some embodiments, forming the frame may include cutting the frame into fourths or halves, as described above in relation to FIGS. 6A-6B. Then expansion frame sections can be inserted to increase the size of the frame. In some embodiments, forming the frame may include attaching modular components of the frame together. Modular components of the frame are shown in FIG. 4.

According to some examples, the method includes affixing a membrane to a seat of the frame at block 1204. Example mounting configurations of the membrane are shown in FIGS. 7 and 8.

According to some examples, the method includes mounting the payload elements to the membrane, at block 1206. In some embodiments, the payload elements may be attached to the membrane prior to mounting the membrane to the frame.

The blocks 1202, 1204 and/or 1206 may form a populated frame assembly (PFA)

According to some examples, the method includes repeating blocks 1202, 1204, and 1206 to form a plurality of PFAs, at block 1208.

According to some examples, the method includes affixing adjacent PFAs of the plurality of NFAs so that the at least one channel of the NF frame members of the adjacent PFAs are opposing to stack and align the NF members of a current PFA within the at least one channel the NF members of the adjacent PFA at block 1210, as shown in FIG. 2C.

FIG. 13 illustrates a perspective view of a NF member 1304 for a frame 1302 in accordance with an embodiment. The longitudinal walls of the NF member 1304 include rib cavities 1306 spaced along the length of the walls. The rib cavities may be hollow in the interior to allow adjacent NF members to nest within the channels 566 (FIG. 5A) and within the rib cavities 1306. The rib cavities 1306 protrude from the longitudinal walls of the NF member 1304. The spacing of the rib cavities 1306 may be the same for each frame being stacked and nested together.

In this configuration, between the rib cavities 1306, the a two-dimensional (2D) cross-section of the NF member is constant. However, 2D cross-section of the NF member varies along the rib cavities.

FIG. 14 illustrates a perspective view of another NF member 1404 for a frame 1402 in accordance with an embodiment. FIG. 14 includes rib cavities 1406. The rib cavities 1406 may have a truncated four-sided pyramid shape. The three sides are external and protrude from the longitudinal walls of the NF member 1404. The fourth side of the pyramid shaped rib cavity is open so that the rib cavities of adjacent frames can stack and nest together.

In this configuration, between the rib cavities 1406, the a two-dimensional (2D) cross-section of the NF member is constant. However, 2D cross-section of the NF member varies along the rib cavities 1406. The configuration of FIGS. 13 and 14 are only examples of stackable 2D cross-section profiles that vary along the length of the NF members.

In FIGS. 13 and 14, each NF member does not have a constant cross-section, in other words, a non-constant cross-section, but is still comprised of a three-dimensional (3D) shape containing at least one recess configured to nest a respective NF member of an adjacent PFA within. The cover frame members that nest without a constant cross section like this or even or dramatic departures from a channel. The 3D shape may or may not be comprised of a repeating pattern of regions.

FIGS. 15A-15H illustrate cross sectional end views of NF members of different configurations in accordance with an embodiment. The 2D cross-section is generally constant along the length of the NF member. The 2D cross-section may vary by the formation of the mounting hole 330 and holes 340 in the top surface, for example. The NF members have a frame profile with at least one channel.

As shown in FIGS. 15A-15H, each NF member includes a hollow structure with a top side and an open base. The height of the hollow structure is between the top side and the open base. The hollow structure includes at least one channel formed in the hollow structure where the open base has a width that is larger than a width of the top side. The opening to each channel may have a larger width at its base or opening than at a peak of the channel.

Figures 15A, 15B, 15C, 15D, 15E, 15F, 15G, 15H:
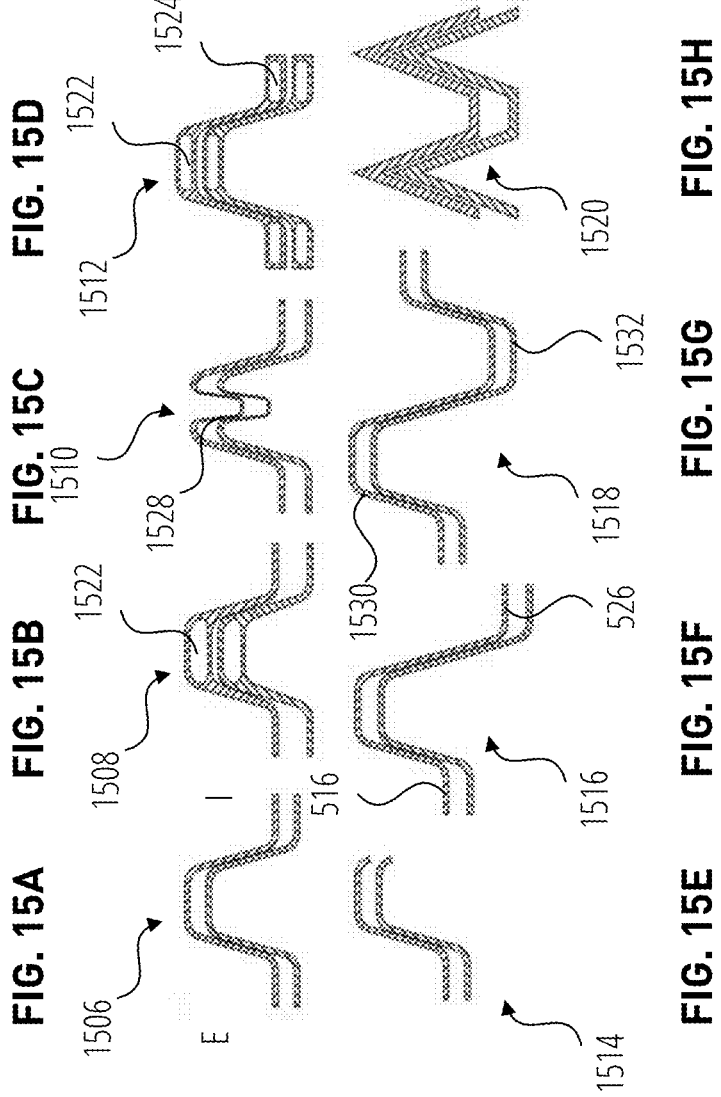
FIGS. 15A-15H illustrate cross sectional end views of NF members of different configurations in accordance with an embodiment.

In FIG. 15A, the NF member 1506 is similar to the end view of NF member 304 with a single channel 566 (FIG. 5A). The NF member 1506 has an exterior side E and an interior side I, relative to the illustration. For the sake of discussion, all NF members of FIGS. 15A-15H have the same exterior side E and an interior side I, In FIG. 15B, the NF member 1508 is similar to the end view of NF member 304. However, the NF member 1508 includes a hidden hollow cavity 1522 under the top surface 520 (FIG. 5A).

In FIG. 15C, the NF member 1510 includes an elongated notch or trench 1528 in the top surface 520 (FIG. 5A). This configuration forms parallel channels that are configured to stack and nest the NF members.

In FIG. 15D, the NF member 1512 is similar to the end view of NF member 1508 that includes a hidden hollow cavity 1522 under the top surface 520 (FIG. 5A). The base feet of the NF member 1512 includes an elongated hollow cavity 1524.

In FIG. 15E, the NF member 1514 is similar to the end view of NF member 304, however, the interior side I or the second longitudinal wall 522 (FIG. 5A) has been omitted.

In FIG. 15F, the NF member 1516 is similar to the end view of NF member 1506. However, the second longitudinal wall 522 (FIG. 5A) of the interior side is extended in length such that the base foot 526 (FIG. 5A) is located in a plane lower than the plane of base foot 516 (FIG. 5A).

In FIG. 15G, the NF member 1518 is similar to the end view of NF member 1516. However, the NF member 1518 has a square wave configuration. The square wave configuration 1530 provides two channels for nesting and stacking. The two channels are open in opposite directions.

In FIG. 15H, the NF member 1520 has an M-shape. The M-shape provides two triangularly shaped channels for nesting the frame assemblies.

In view of the foregoing, the NF members may include at least one channel. The NF members may have hidden cavities. The NF members may include rib cavities that vary the 2D cross-section.

Figure 16:
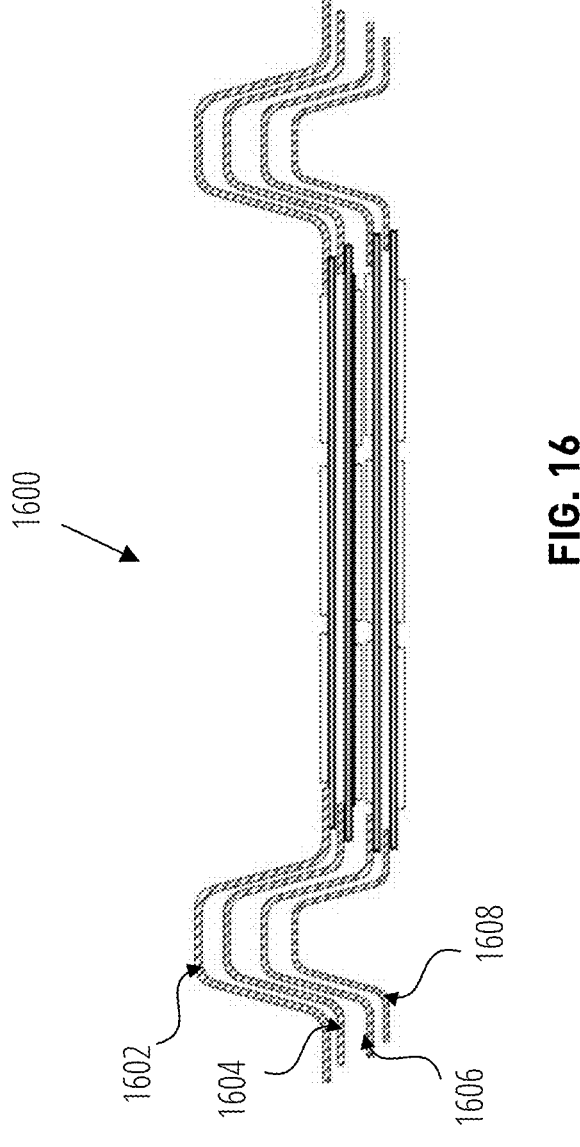
FIG. 16 illustrates a partial end view of a nested populated frame arrays with four PFAs in a folded nested state in accordance with one embodiment.

FIG. 16 illustrates a partial end view of a nested populated frame arrays 1600 with four PFAs in a folded nested state in accordance with one embodiment. In the illustration, the NF members of the top PFA 1602 has a wider base relative to the PFA 1604 immediately below. The PFA 1604 has a wider base relative to the PFA 1606 immediately below. The PFA 1606 has a wider base relative to the PFA 1608 immediately below.

According to an embodiment, the height of the top PFA 1602 may be taller than the height of PFA 1604 immediately below. The height of the PFA 1604 may be taller than the height of PFA 1606 immediately below. The height of the PFA 1606 may be taller than the height of PFA 1608 immediately below.

Accordingly, the size of the NF members of the stack of PFAs may decrease in size from the lowest in the stack to the highest in the stack.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having." "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

What is claimed is:

1. A system comprising:
    N populated frame assemblies (PFAs) having a folded nested state and an unfolded state, wherein the N PFAs are deployable from the folded nested state to the unfolded state and the N PFAs have a nesting stack height when in the folded nested state that is less than a sum of the individual height of all PFAs of the N PFAs, where the N is a non-zero integer number greater than one, wherein each PFA comprises a frame that comprises nestable frame (NF) members on first parallel and opposing sides of the frame, wherein each NF member comprises a top surface with a longitudinal length and a first longitudinal wall and a second longitudinal wall, wherein the first and second longitudinal walls are opposing, wherein each NF member further comprises at least one channel configured to nest a respective NF member of an adjacent PFA within the at least one channel, wherein the at least one channel is formed from an underside of the top surface and between interior surfaces of the first and second longitudinal walls of each NF member.

2. The system of claim 1, further comprising a satellite or spacecraft having the N PFAs affixed to the satellite or spacecraft.

3. The system of claim 1, wherein each PFA further includes:
    traverse frame members perpendicular to the NF members,
    wherein the frame is one of a monolithic structure and a modular structure.

4. The system of claim 1, wherein the N PFAs include:
    first PFAs configured to deploy in series, the first PFAs includes a support PFA; and
    second PFAs affixed to the support PFA, the second PFAs deploy from the support PFA in a parallel.

5. The system of claim 1, wherein each PFA further includes:
    traverse frame members on second parallel and opposing sides of the frame that are perpendicular to the NF members; and
    insertable extension frame sections to expand the frame along at least one dimension.

6. The system of claim 1, wherein each PFA includes:
    subframes that include self-aligning, nestable frame (NF) members on first parallel and opposing sides of the subframe and traverse frame members perpendicular to the NF members,
    wherein the subframes share a respective NF member of the NF members.

7. The system of claim 1, wherein each PFA is coupled to an adjacent PFA by an unfolding mechanism that produces a motive force.

8. The system of claim 1, wherein the frame of each PFA includes a frame profile with the at least one channel; and frames of adjacent PFAs are connected so that the at least one channel of the frame profiles are opposing.

9. The system of claim 1, wherein each PFA further includes:
    a seat between the NF members;
    a recess in a center of the frame configured to allow a next frame of a next PFA to nest in the recess when stacked; and
    a membrane coupled to the seat of the frame;
    wherein the NF members are self-aligning.

10. The system of claim 9, wherein each PFA further includes a payload affixed to the membrane.

11. The system of claim 9, wherein:
    each NF member includes a hollow structure with a top side and an open base and a height between the top side and the open base;
    the hollow structure including the at least one channel formed in the hollow structure; and
    the open base has a width that is larger than a width of the top side.

12. The system of claim 9, wherein each NF member is comprised of a two-dimensional constant cross-section.

13. The system of claim 9, wherein each NF member does not have a constant cross-section but is still comprised of a three-dimensional shape containing at least one recess configured to nest a respective NF member of an adjacent PFA within,
    wherein the three-dimensional shape may or may not be comprised of a repeating pattern of regions.

* * * * *